(12) United States Patent
Yukinori et al.

(10) Patent No.: US 9,467,013 B2
(45) Date of Patent: Oct. 11, 2016

(54) BRUSHLESS MOTOR

(71) Applicant: SAMSUNG ELECTRONICS CO., LTD., Suwon-si (KR)

(72) Inventors: Nakagawa Yukinori, Osaka (JP); Yasumasa Nagasaki, Osaka (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 567 days.

(21) Appl. No.: 14/046,051

(22) Filed: Oct. 4, 2013

(65) Prior Publication Data

US 2014/0097718 A1   Apr. 10, 2014

(30) Foreign Application Priority Data

| Oct. 4, 2012 | (JP) | ................................. 2012-221844 |
| Nov. 8, 2012 | (JP) | ................................. 2012-246384 |
| Nov. 27, 2012 | (JP) | ................................. 2012-259041 |
| Sep. 6, 2013 | (JP) | ................................. 2013-184844 |
| Sep. 6, 2013 | (JP) | ................................. 2013-184848 |
| Sep. 27, 2013 | (KR) | ........................ 10-2013-0114874 |

(51) Int. Cl.
| H02K 1/27 | (2006.01) |
| H02K 1/28 | (2006.01) |
| H02K 15/03 | (2006.01) |
| H02K 21/16 | (2006.01) |

(52) U.S. Cl.
CPC .......... *H02K 1/2706* (2013.01); *H02K 1/2773* (2013.01); *H02K 15/03* (2013.01); *H02K 21/16* (2013.01); *H02K 2213/03* (2013.01)

(58) Field of Classification Search
CPC .. H02K 1/2706; H02K 1/2773; H02K 15/03; H02K 21/14; H02K 21/16
USPC ............... 310/216.074, 216.097, 216.112, 310/156.43–156.57
See application file for complete search history.

(56) References Cited

U.S. PATENT DOCUMENTS

| 6,262,508 B1* | 7/2001 | Shibayama | ............ H02K 21/00 310/152 |
| 6,844,647 B2* | 1/2005 | Horber | ................... H02K 21/16 310/112 |
| 2003/0080642 A1* | 5/2003 | Mori | ...................... H02K 1/276 310/156.57 |
| 2009/0096308 A1* | 4/2009 | Staudenmann | ...... H02K 1/2773 310/156.08 |

FOREIGN PATENT DOCUMENTS

| JP | 2010-098937 | 4/2010 |
| KR | 10-2006-0024191 | 3/2006 |

* cited by examiner

*Primary Examiner* — Tran Nguyen
(74) *Attorney, Agent, or Firm* — Staas & Halsey LLP

(57) ABSTRACT

Disclosed is a magnetic flux concentrated-type brushless motor performing field weakening control and reducing iron loss. The teeth of the stator are provided with a stator-side wide-width portion, and the rotor is provided with magnetic members having a rotor-side wide-width portion, and magnets disposed between the magnetic members. The motor is driven for a certain time in a low rate of rotation (LRR) section and a high rate of rotation (HRR) section. Field weakening control is performed in the HRR section. When the number of pairs of opposite poles of the rotor is P, a length of a radial line of the rotor-side wide-width portion R, a thickness of the stator-side wide-width portion Lt, a central angle of the stator-side wide-width portion τt, a central angle the rotor-side wide-width portion τr, and a central angle between any two neighboring magnets τM, the motor is set such that $\tau r \leq 2.85 \times \tau m - 2.65 \times \tau t$ and $(Lt \times P)/(\tau t \times R) \geq \tau t/\tau m - 0.6$.

13 Claims, 21 Drawing Sheets

FIG. 8
(a)
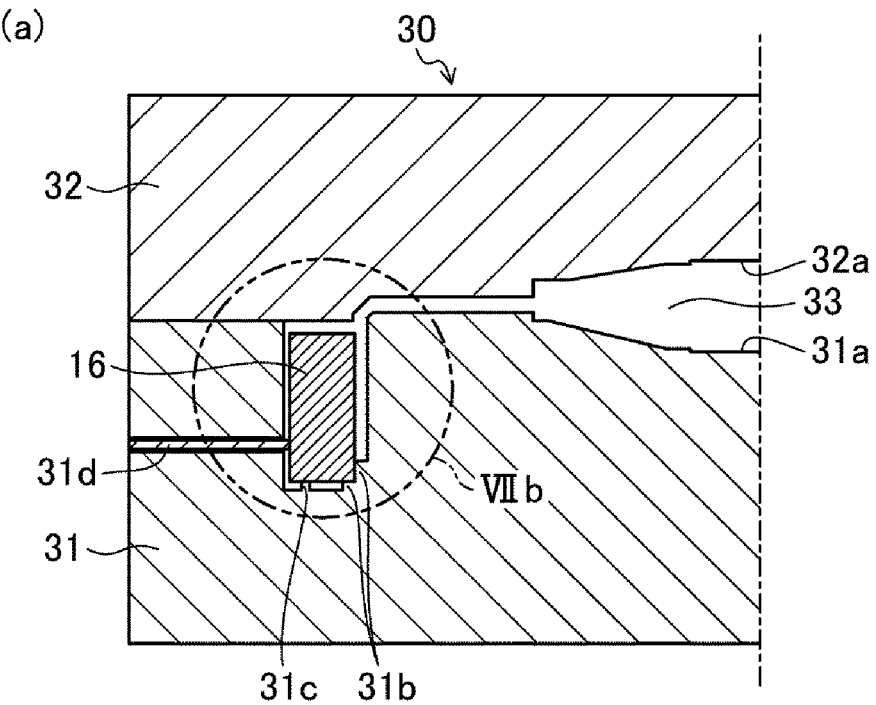
(b)
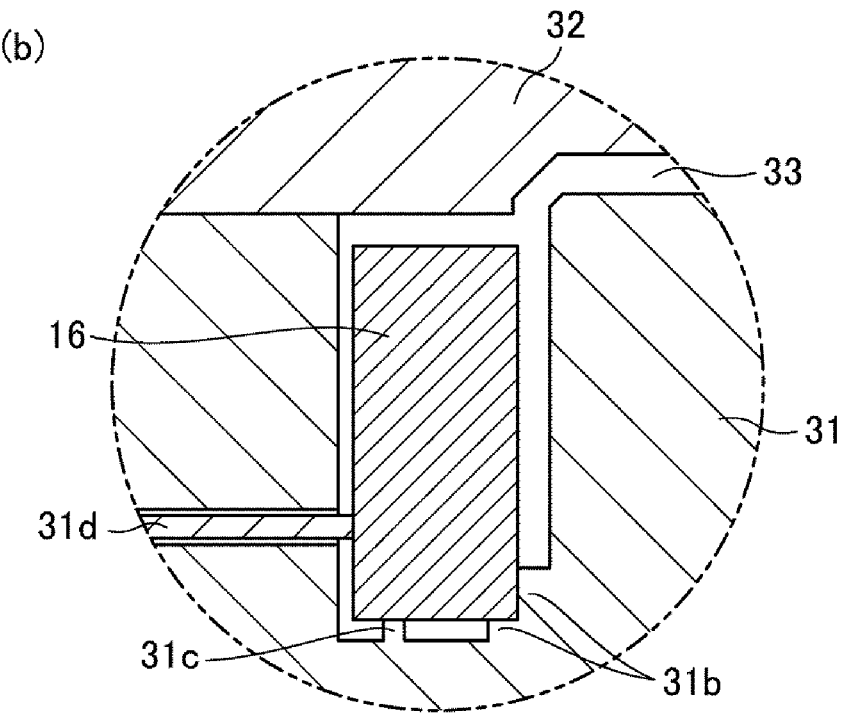

FIG. 20

|  |  | τr (ELECTRICAL ANGLE) | | | | |
|---|---|---|---|---|---|---|
|  |  | 100 | 110 | 125 | 140 | 155 |
| Lr (mm) | 1 | × | × | × | × | × |
|  | 1.5 | × | × | × | × | × |
|  | 2 | × | × | ○ | ○ | ○ |
|  | 2.5 | × | ○ | ○ | ○ | ○ |
|  | 3 | ○ | ○ | ○ | ○ | ○ |

BRUSHLESS MOTOR

CROSS-REFERENCE TO RELATED APPLICATION(S)

This application claims the benefit of Japanese Patent Application No. 2012-221844, filed on Oct. 4, 2012, Japanese Patent Application No. 2012-246384, filed on Nov. 8, 2012, Japanese Patent Application No. 2012-259041, filed on Nov. 27, 2012, Japanese Patent Application No. 2013-134844, filed on Sep. 6, 2013, and Japanese Patent Application No. 2013-134848, filed on Sep. 6, 2013 in the Japanese Patent Office, and Korea Patent Application No. 10-2013-0114874, filed on Sep. 27, 2013 in the Korea Patent Office, the disclosure of which is incorporated herein by reference.

BACKGROUND

1. Field

Embodiments of the present invention relate to a magnetic flux concentrated-type brushless motor which is used in a washing machine and performs field weakening control.

2. Description of the Related Art

For a motor used in a washing machine, stable output power is required in two different sections of rotation. That is, while high torque of the motor at a low rate of rotation is required for the washing operation, low torque at a high rate of rotation is required for the spin-drying operation. To implement high torque in the washing operation, using a permanent magnet producing strong magnetic force, for example, a neodymium magnet is effective. However, since neodymium magnets are expensive, a ferrite magnet which is less expensive is often used in order to reduce manufacturing costs. As a motor to implement high torque using a ferrite magnet, mention may be made of a magnetic flux concentrated-type motor, which has magnets and magnetic members radially disposed in an alternating fashion and concentrating magnetic flux from the magnets upon a stator. In the case of a washing machine within which the magnetic flux concentrated-type motor is mounted, field weakening control is performed to implement high rate of rotation during the spin-drying operation.

As the magnetic flux density of a magnetic pole is increased to achieve a high rate of rotation, the motor is likely to undergo iron loss. In addition, as a result of intensification of magnetic force by concentration of the magnetic flux, noise or vibration is likely to occur. Further, since current to produce magnetic flux to weaken the fields of the magnets flows in the coil of the stator, demagnetization may occur in areas of the magnets near the stator. As a result, motor efficiency may be degraded.

SUMMARY

Therefore, it is an aspect of the present invention to provide a brushless motor that may effectively reduce iron loss using properties of the motor.

It is another aspect of the present invention to provide a magnetic flux concentrated-type brushless motor which may reduce noise which is produced during rotation at high speed.

It is a further aspect of the present invention to provide a magnetic flux concentrated-type brushless motor which may suppress degradation of electromotive force and enhance resistance to demagnetization, while performing field weakening control.

Additional aspects of the invention will be set forth in part in the description which follows and, in part, will be obvious from the description, or may be learned by practice of the invention.

In accordance with one aspect of the present invention, a brushless motor includes a rotor rotatable about an axis of rotation, and a stator disposed inside or outside the rotor.

The stator includes a yoke provided with a circumferential surface having a ring-shaped cross section and facing the rotor, a plurality of teeth, each of the teeth radially protruding from the circumferential surface of the yoke toward the rotor and being provided, at a protruding end thereof, with a rotor-side wide-width portion having both lateral sides protruding to form a widened width, and a plurality of coils formed by winding wires around the teeth through the slots formed between neighboring ones of the teeth several times.

The rotor includes a plurality of magnetic members, each of the magnetic members being provided with a rotor-side wide-width portion radially disposed at a circumferential edge of the rotor to face the stator and provided, at a stator-side end thereof, with both lateral sides protruding to form a widened width, and a plurality of magnets, each of the magnets being disposed between neighboring ones of the magnetic members such that the same magnetic poles face each other in a circumferential direction. The stator-side wide-width portion and the rotor-side wide-width portion face each other with a fine gap formed therebetween.

The motor is driven for a certain time in at least two different rate of rotation sections including a low rate of rotation (LRR) section and a high rate of rotation (HRR) section. Field weakening control is performed in the HRR section.

In the motor viewed in the direction of the axis of rotation, when the number of pairs of opposite poles of the rotor is P, a length of a radial line connecting a cross-sectional surface of the rotor-side wide-width portion facing the fine gap to the axis of rotation is R, a radial thickness of the stator-side wide-width portion is Lt, a central angle between two radial lines connecting both circumferential ends of the stator-side wide-width portion to the axis of rotation is $\tau t$, a central angle between two radial lines connecting both circumferential ends of the rotor-side wide-width portion to the axis of rotation is $\tau r$, and a central angle between two radial lines connecting centers of any two neighboring magnets to the axis of rotation is $\tau m$, the motor is set such that $\tau r \leq 2.85 \times \tau m - 2.65 \times \tau t$ and $(Lt \times P)/(\tau t \times R) \geq \tau t/\tau m - 0.6$.

That is, the brushless motor is a magnetic flux concentrated-type motor which is driven in the LRR and HRR sections for a certain time and performs field weakening control in the HRR section. The teeth radially protrude from the circumferential surface of the yoke of the stator, and the stator-side wide-width portions formed at the protruding ends of the teeth and the rotor-side wide-width portions face each other with a fine gap formed therebetween. Thereby, the magnets are disposed to meet the predetermined conditions as disclosed above.

According to this brushless motor, iron loss may be effectively reduced using the properties of the motor.

In addition, the motor may be set such that $0.5 \leq \tau r/\tau m \leq 0.75$.

Thereby, degradation of electromotive force may be avoided, and therefore iron loss may be reduced without causing great loss of torque.

Specifically, when the number of slots of the stator is S, S may be equal to or greater than 24 and satisfy a relation of $4/3 \times S \geq 2 \times P > S$.

In this case, stable motor performance may be achieved in the LRR section.

For example, when S is equal to or greater than 24, a residual magnetic flux density of each of the magnets may be set to be within a range of 0.35 T to 0.5 T.

In this case, inexpensive ferrite magnets may be used as the magnets, and thereby manufacturing costs may be reduced.

When S is less than 24, the residual magnetic flux density of each of the magnets may be set to be within a range of 1.1 T to 1.5 T.

In this case, neodymium magnets may be used as the magnets, and high torque may be maintained even when the size of the magnets is decreased according to miniaturization of the motor.

In accordance with another aspect of the present invention, a brushless motor includes a rotor rotatable about an axis of rotation, and a stator disposed inside or outside the rotor.

The stator includes a yoke provided with a circumferential surface having a ring-shaped cross section and facing the rotor, a plurality of teeth, each of the teeth radially protruding from the circumferential surface of the yoke toward the rotor and being provided, at a protruding end thereof, with a rotor-side wide-width portion having both lateral sides protruding to form a widened width, and a plurality of coils formed by winding wires around the teeth through the slots formed between neighboring ones of the teeth several times.

The rotor includes a plurality of magnetic members, each of the magnetic members being provided with a rotor-side wide-width portion radially disposed at a circumferential edge of the rotor to face the stator and provided, at a stator-side end thereof, with both lateral sides protruding to form a widened width, and a plurality of magnets, each of the magnets being disposed between neighboring ones of the magnetic members such that the same magnetic poles face each other in a circumferential direction. The stator-side wide-width portion and the rotor-side wide-width portion face each other with a fine gap formed therebetween.

The motor is driven for a certain time in at least two different rate of rotation sections including a low rate of rotation (LRR) section and a high rate of rotation (HRR) section. Field weakening control is performed in the HRR section.

In the motor viewed in the direction of the axis of rotation, when a central angle between two radial lines connecting both circumferential ends of the stator-side wide-width portion to the axis of rotation is $\tau t$, a central angle between two radial lines connecting both circumferential ends of the rotor-side wide-width portion to the axis of rotation is $\tau r$, and a central angle between two radial lines connecting centers of any two neighboring magnets to the axis of rotation is $\tau m$, the motor is set such that $\tau r \leq 1.1 \times \tau m - 0.46 \times \tau t$.

That is, the brushless motor is a magnetic flux concentrated-type motor which is driven in the LRR and HRR sections for a certain time and performs field weakening control in the HRR section. The teeth radially protrude from the circumferential surface of the yoke of the stator, and the stator-side wide-width portions formed at the protruding ends of the teeth and the rotor-side wide-width portions face each other with a fine gap formed therebetween. Thereby, the magnets are disposed to meet the predetermined conditions as disclosed above.

According to the brushless motor configured as above, when the motor is driven in the HRR section through field weakening control in addition to the LRR section, attractive force periodically applied to the stator at a high rate of rotation may be suppressed in contrast with the case of a conventional motor. Accordingly, noise may be reduced.

In addition, the motor may be set such that $0.5 \leq \tau r / \tau m \leq 0.75$.

Thereby, degradation of electromotive force may be avoided, and therefore iron loss may be reduced without causing great loss of torque.

Specifically, when the number of pairs of opposites poles of the rotor is P, and the number of slots of the stator is S, the motor may be set such that S is equal to or greater than 24, and S and P satisfy a relation of $4/3 \times S \geq 2 \times P > S$.

In this case, stable motor performance may be achieved in the LRR section.

For example, when S is equal to or greater than 24, a residual magnetic flux density of each of the magnets may be set to be within a range of 0.35 T to 0.5 T.

In this case, inexpensive ferrite magnets may be used as the magnets, and thereby manufacturing costs may be reduced.

When S is less than 24, the residual magnetic flux density of each of the magnets may be set to be within a range of 1.1 T to 1.5 T.

In this case, neodymium magnets may be used as the magnets, and high torque may be maintained even when the size of the magnets is decreased according to miniaturization of the motor.

In accordance with a further aspect of the present invention, a brushless motor includes a rotor rotatable about an axis of rotation, and a stator disposed inside or outside the rotor, wherein the stator includes a yoke provided with a circumferential surface having a ring-shaped cross section and facing the rotor, a plurality of teeth, each of the teeth radially protruding from the circumferential surface of the yoke toward the rotor, and a plurality of coils formed by winding wires around the teeth through the slots formed between neighboring ones of the teeth several times, and the rotor includes a plurality of magnetic members, each of the magnetic members being provided with a rotor-side wide-width portion radially disposed at a circumferential edge of the rotor to face the stator and provided, at a stator-side end thereof, with both lateral sides protruding to form a widened width, and a plurality of magnets, each of the magnets being disposed between neighboring ones of the magnetic members such that the same magnetic poles face each other in a circumferential direction. The motor is driven for a certain time in at least two different rate of rotation sections including a low rate of rotation (LRR) section and a high rate of rotation (HRR) section. Field weakening control is performed in the HRR section.

When a distance between a stator-side cross-sectional surface of any one of the magnetic members and a stator-side cross-sectional surface of a corresponding one of the magnets in the diametrical direction of the rotor is Lr, and a central angle between two radial lines connecting both circumferential ends of the rotor-side wide-width portion to the axis of rotation, when viewed in the direction of the axis of rotation is $\tau r$, the motor is set such that Lr is within a range of $2.0\ mm \leq Lr \leq 3.5\ mm$, and $\tau r$ represented by an electrical angle is within a range of $110° \leq \tau r \leq 140°$.

The rotor may further include a rotor body formed of a resin to have a cylindrical shape and disposed such that the rotor and the stator are coaxially arranged, wherein the rotor body includes a circular pipe-shaped inner circumferential wall, a circular pipe-shaped outer circumferential wall disposed at a diametrically outer side of the inner circumferential wall, a first surface to connect one axial end of the inner circumferential wall to one axial end of the outer circumferential wall, a second surface to connect the other axial end of the inner circumferential wall to the other axial end of the outer circumferential wall, the magnetic members and the magnets being housed in an inner space defined by the inner circumferential wall, the outer circumferential wall, the first surface, and the second surface, wherein an angled corner formed by the inner circumferential wall and the first surface is provided, at a portion thereof corresponding to each of the magnets, with a slot extending from the inner circumferential wall to the first surface, and the outer circumferential wall is provided, at a portion thereof corresponding to each of the magnets, with a through hole penetrating the outer circumferential wall in a thickness direction of the outer circumferential wall.

When the number of pairs of opposite poles of the rotor is P and the number of slots of the stator is S, P and S satisfy a relation of $S<2\times P<4/3\times S$.

In accordance with a further aspect of the present invention, there is provided a method of manufacturing a rotor used in a brushless motor according to the second invention using an injection molding mold provided with a first mold, a second mold disposed to face the first mold and defining a cavity for molding of a body of the rotor in cooperation with the first mold, a slide-type protruding end protruding from a portion of one diametrical sidewall of the cavity corresponding to a magnet, and a protrusion formed to protrude from a portion of the opposite diametrical sidewall of the cavity corresponding to the magnet to one side in the diametrical direction, the method including laterally fitting the magnet accommodated in the cavity into the rotor in a diametrical direction using the slide-type protruding end and the protrusion wherein, with the injection molding mold in a mold closed state, and filling the cavity with a molten resin to perform injection molding.

The method may further include radially disposing the magnetic members in an annular shape and disposing the magnets between neighboring ones of the magnetic members, applying an adhesive to one cross-sectional surface of both cross-sectional surfaces of the magnetic members and the magnets disposed in the annular form, the cross-sectional surfaces facing in the axial direction.

BRIEF DESCRIPTION OF THE DRAWINGS

These and/or other aspects of the invention will become apparent and more readily appreciated from the following description of the embodiments, taken in conjunction with the accompanying drawings of which:

FIG. 8 illustrates a cross section of a mold to mold a rotor, in which FIG. 8(*a*) is a view showing a portion of the mold where the magnet is disposed, and FIG. 8(*b*) is an enlarged view showing the region VIIb of FIG. 8(*a*);

FIG. 20 is a view illustrating a relation between the central angle τr and the distance Lr and occurrence of demagnetization.

DETAILED DESCRIPTION

Figure 1:
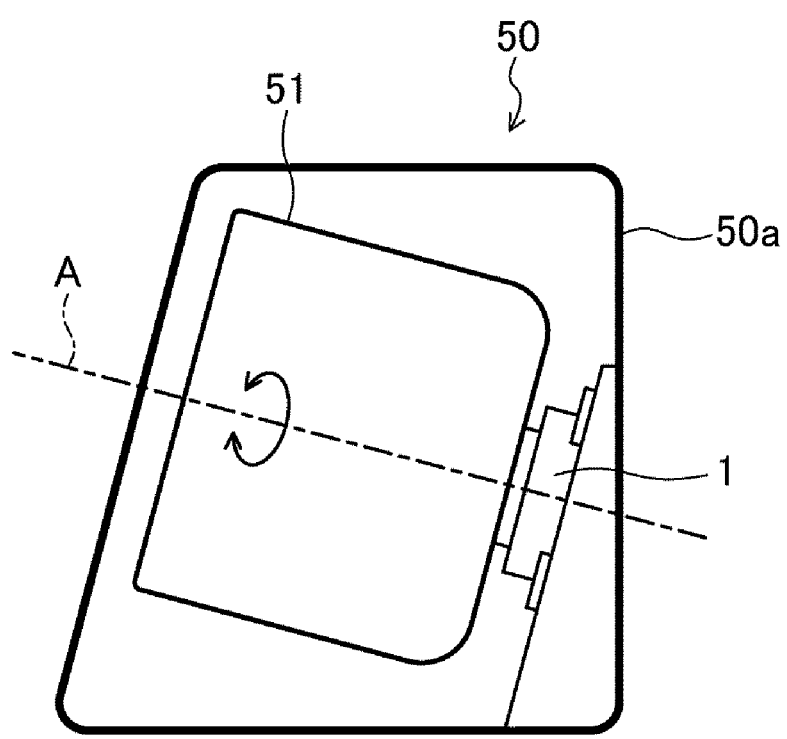
FIG. 1 is a cross-sectional view schematically illustrating a washing machine equipped with a motor according to an exemplary embodiment.

It should be understood that embodiments disclosed in this specification and constituents shown in the accompanying drawings are simply illustrative and there are many variations which may replace the embodiments and drawings of this specification at the time of filing of this application.

Reference will now be made in detail to the embodiments of the present invention, examples of which are illustrated in the accompanying drawings, wherein like reference numerals refer to like elements throughout.

FIG. 1 exemplarily shows a washing machine 50 to which a brushless motor 1 (hereinafter, simply referred to as a motor) according to one embodiment is applied. The washing machine 50 is a horizontal installation-type washing machine. A drum 51 into which laundry is introduced is accommodated in a housing 50*a*, with an opening thereof facing forward. The drum 51 rotates about an axis of rotation A extending in a horizontal direction or a horizontally inclined direction. In addition, the washing machine 50 is automatically operated. A series of operations including washing, rinsing and spin-drying are performed in one drum 51.

The motor 1 is disposed between the bottom surface of the drum 51 and the rear surface of the housing 50*a*. The motor 1 (a direct drive motor) is connected directly to the drum 51 without a speed reducer interposed between the motor 1 and the drum 51. The drum 51 and the motor 1 rotate at approximately the same rate of rotation.

Since a large amount of water is contained in the drum 51 during the washing or rinsing operation, the drum 51 needs to be driven at a relatively low speed for a certain time. On the other hand, when the spin-drying operation, which requires strong centrifugal force, is performed, the drum 51 needs to be driven at a high speed for a certain time.

Figure 2:
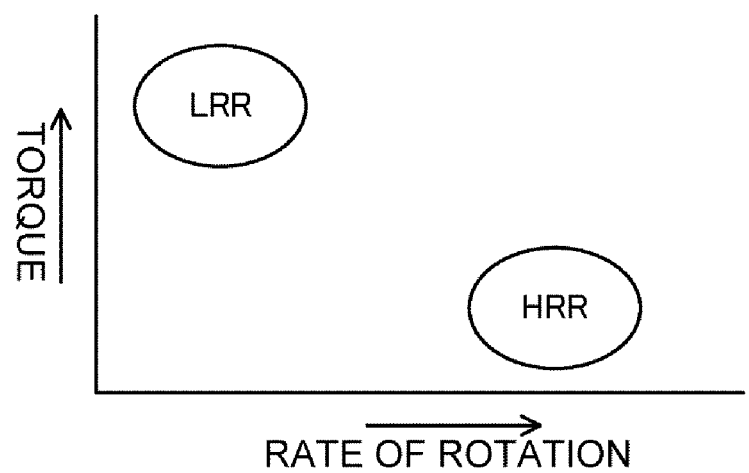
FIG. 2 is a view schematically illustrating the main output regions of the motor.
Figure 3:
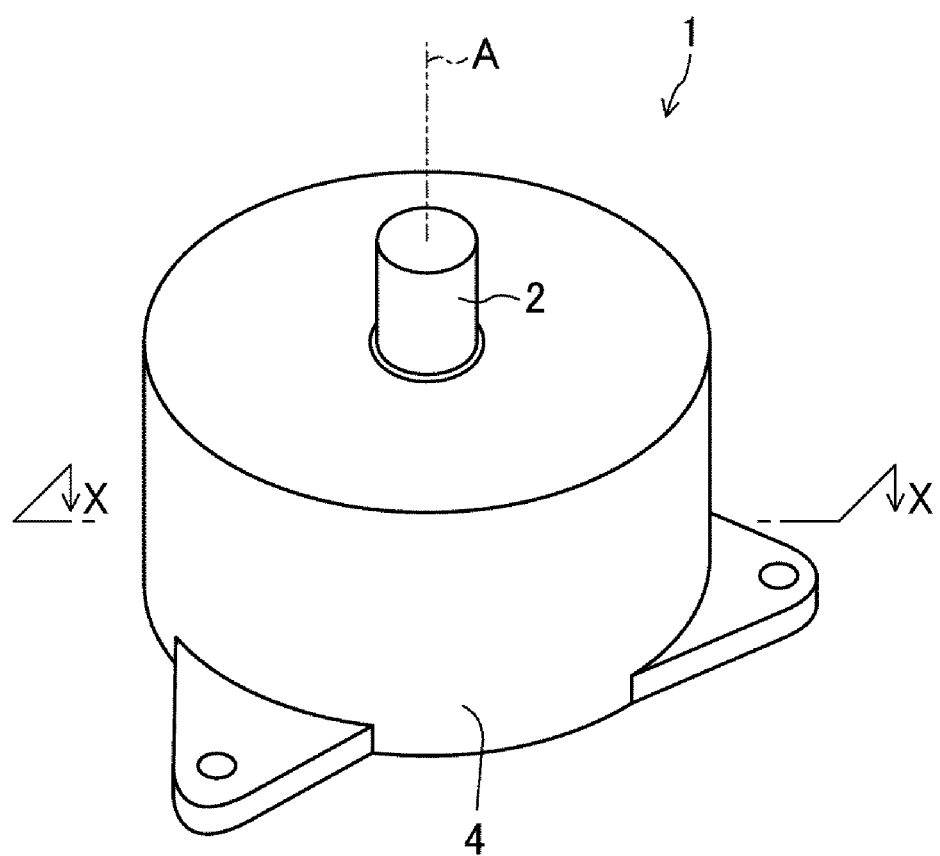
FIG. 3 is a perspective view schematically illustrating a motor according to one embodiment.
Figure 4:
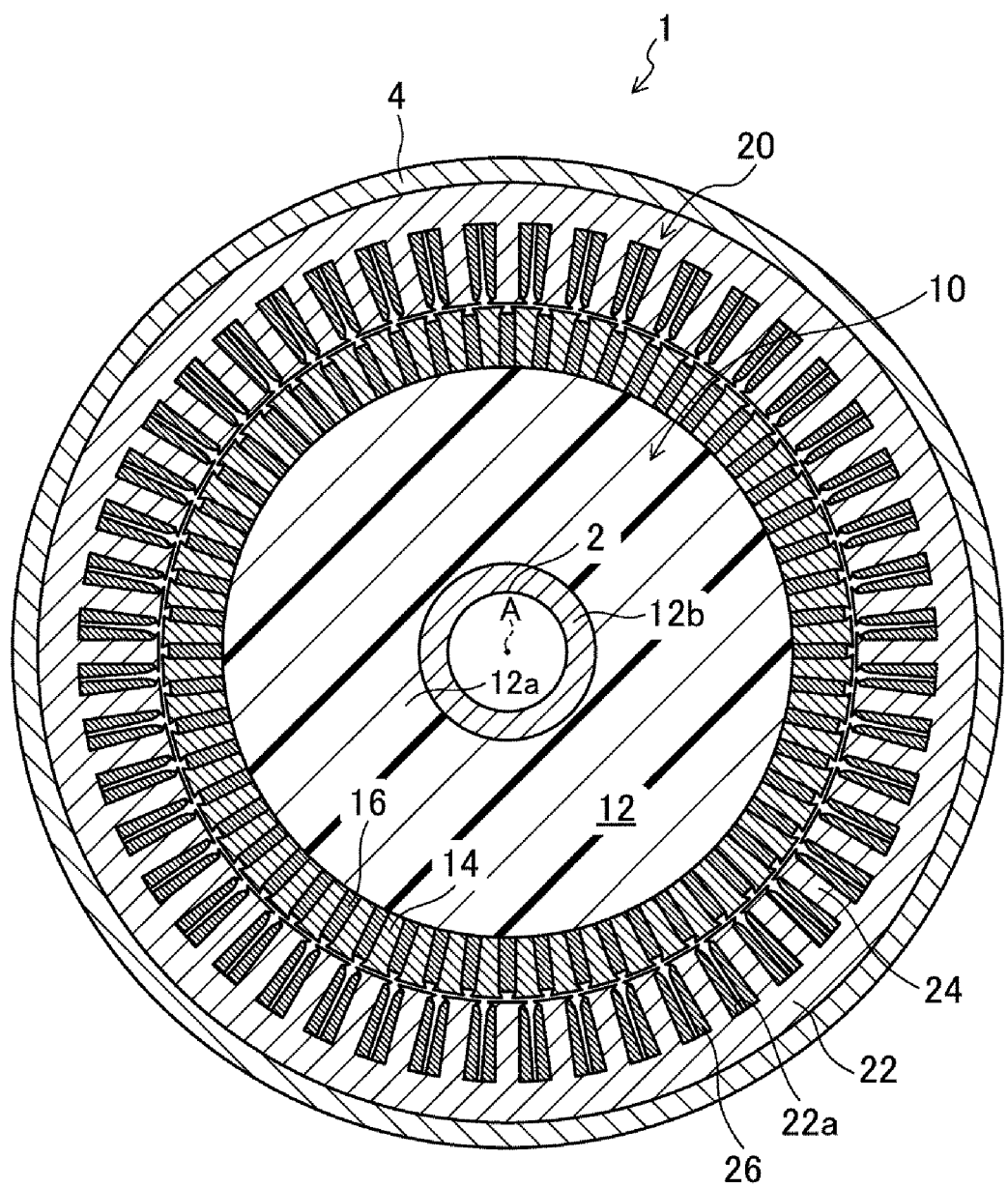
FIG. 4 is a cross-sectional view taken along line X-X of FIG. 3.
Figure 5:
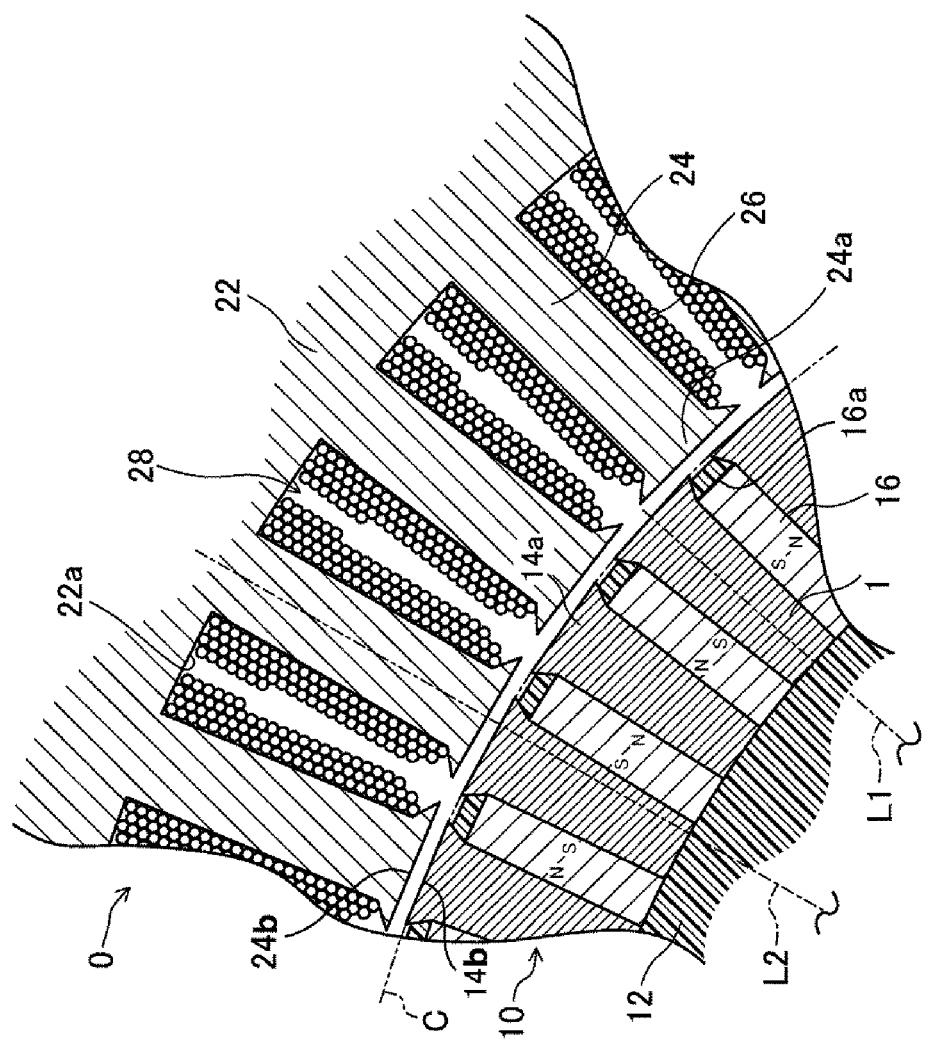
FIG. 5 is an enlarged view illustrating a portion shown in FIG. 4.
Figure 6:
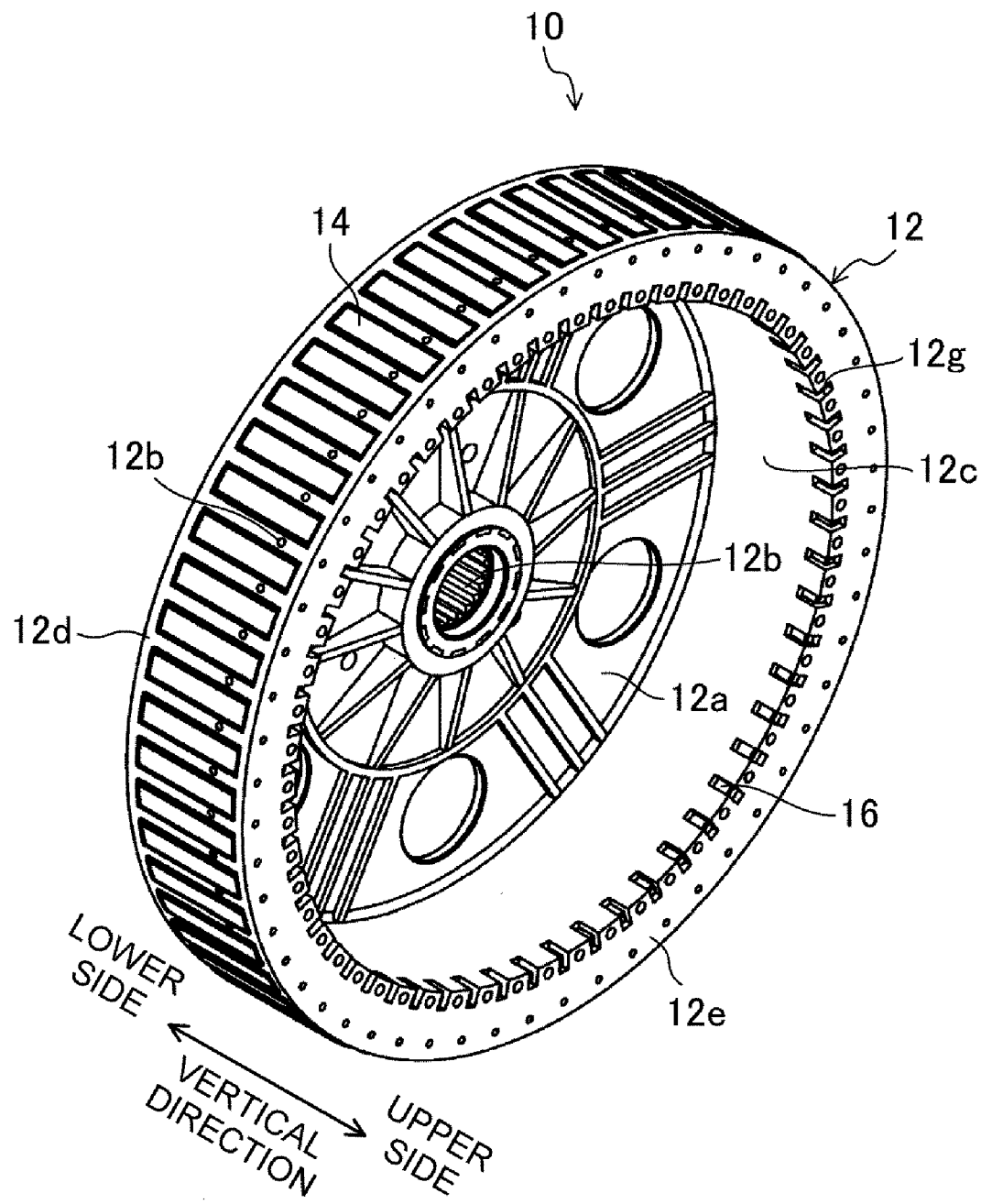
FIG. 6 is an overall perspective view illustrating a rotor.
Figure 7:
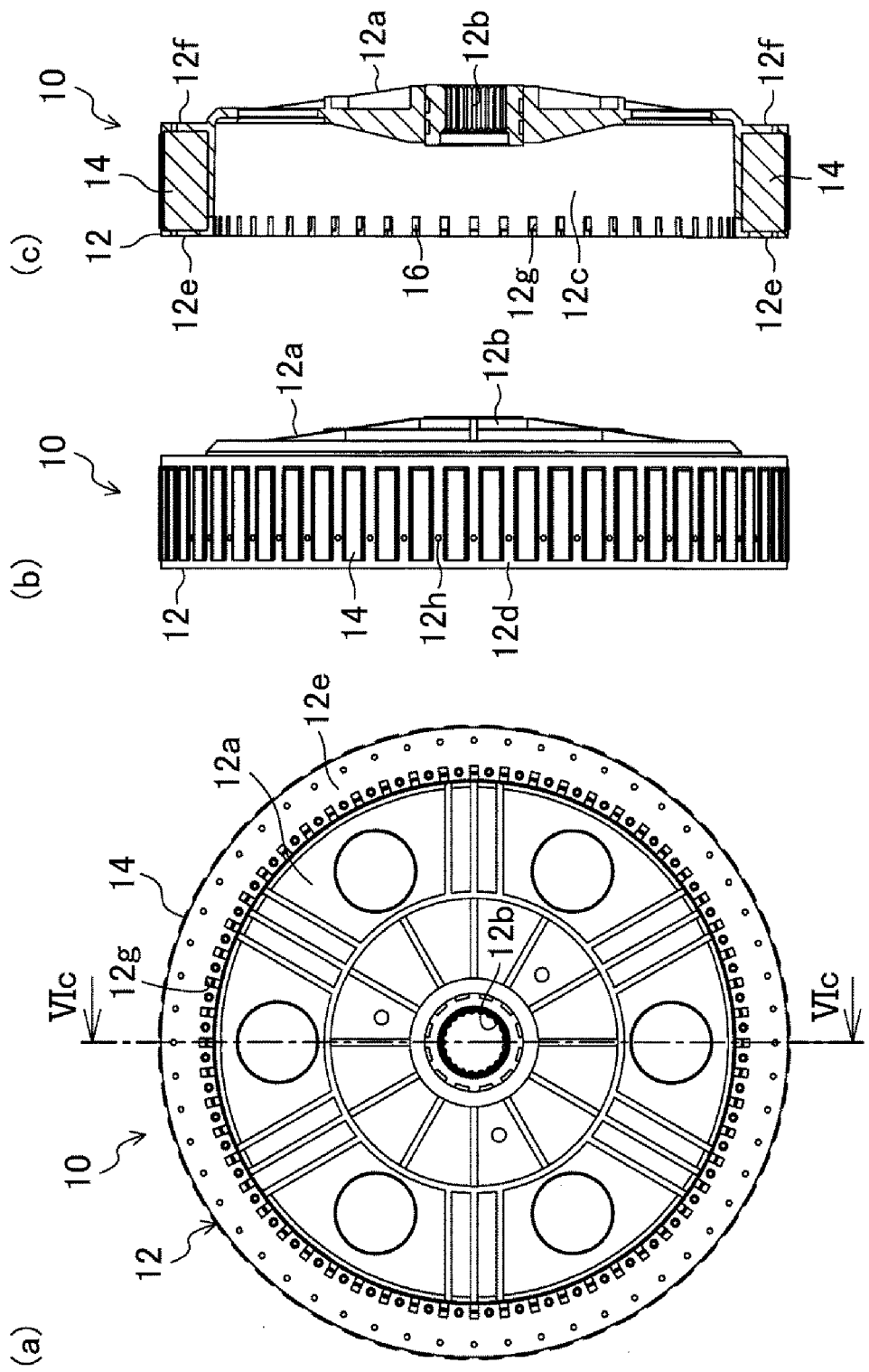
FIG. 7 shows the rotor, in which FIG. 7(*a*) is a plan view of the rotor, FIG. 7(*b*) is a front view of the rotor, and FIG. 7(*c*) is a cross-sectional view of the rotor taken along line Vic-Vic of FIG. 7(*a*)

Accordingly, the motor 1 is set to produce stable output for a certain time in these two operational sections with different conditions. Specifically, as shown in FIG. 2, the motor 1 is set to produce stable output for a certain time at a low rate of rotation (LRR) section, which requires an output of high torque at a relatively low rate of rotation in accordance with the washing or rinsing operation, and a high rate of rotation (HRR) section, which requires an output of low torque at a relatively high rate of rotation in accordance with the spin-drying operation FIGS. 3 to 5 show the motor in detail. FIG. 6 is an overall perspective view of a rotor. FIG. 7 shows the rotor, in which FIG. 7(a) is a plan view of the rotor, FIG. 7(b) is a front view of the rotor, and FIG. 7(c) is a cross-sectional view of the rotor taken along line VIc-VIc of FIG. 7(a).

The motor 1 includes a shaft 2 or a motor case 4, a rotor 10, and a stator 20. The motor 1 is an inner rotor-type motor. Accordingly, the rotor 10 is disposed in the stator 20.

The rotor 10 includes a rotor body 12, a magnetic member 14, and a magnet 16.

The rotor body 12 is formed of a resin-molded article having a cylindrical shape. The rotor body 12 is provided, at a central portion thereof, with a bottom 12a. A cylindrical serration 12b is provided at the center of the bottom 12a. The shaft 2 is press-fitted into the serration 12b. Thereby, the shaft 2 and the rotor 10 are integrated with each other with the centers thereof aligned with the axis of rotation A.

The integrated shaft 2 and rotor 10 are rotatably supported by the motor case 4. The motor case 4 is supported by the housing 50a via a bracket. One end of the shaft 2 protrudes outward through a shaft hole formed in the motor case 4. The one end of the shaft 2 is connected to a drive mechanism (not shown) of the drum 51.

In addition, as shown in FIGS. 6 and 7, the outer circumferential end of the bottom 12a is provided with a cylindrical pipe-shaped inner circumferential wall 12c perpendicular to the bottom 12a, a cylindrical pipe-shaped outer circumferential wall 12d arranged at the diametrically outer side of the inner circumferential wall 12c to be parallel with the inner circumferential wall 12c, an annular upper surface 12e (a first surface) to connect the upper ends (ends in the axial direction) of the inner circumferential wall 12c and the outer circumferential wall 12d to each other, and a lower surface 12f (a second surface) to connect the lower end (the other ends in the axial direction) of the inner circumferential wall 12c and the outer circumferential wall 12d to each other. In addition, the lower surface 12f forms a portion of the bottom 12a.

The magnetic member 14 and the magnet 16 are installed in a space defined by the inner and outer circumferential walls 12c and 12d and the upper and lower surfaces 12e and 12f. A rectangular slit 12g extending from the upper end of the inner circumferential wall 12c to the inner circumferential end of the upper surface 12e is formed at a portion of an angled edge between the inner circumferential wall 12c and the upper surface 12e corresponding to the magnet 16. The upper inner circumferential end of the magnet 16 is exposed through the slit 12g. In addition, a pin hole 12h (a through hole) penetrating the outer circumferential wall 12d in the thickness direction is formed at a portion of the upper end of the outer circumferential wall 12d corresponding to the magnet 16. In addition, a vertically extending rectangular opening is formed at a portion of the outer circumferential wall 12d corresponding to the magnetic member 14. The outer cross-sectional surface of the magnetic member 14 is exposed through this opening.

In addition, the motor 1 according to one embodiment employs fifty six magnetic members 14 and fifty six magnets 16. The number of magnetic poles is 56, and the number of pairs of opposite poles (the number of pairs of magnetic north (N) and south (S) poles) is 28.

The magnetic members 14 are formed of a material exhibiting excellent magnetization performance. The magnetic member 14 is formed by stacking, for example, metal plates in the axis of rotation A. The magnetic members 14 are disposed equally spaced from each other along the outer circumferential portion of the rotor body 12 to radially extend in the radial direction. Specifically, when viewed in the direction of the axis of rotation A, the magnetic members 14 are buried in the outer circumferential portion of the rotor body 12 such that lines L1 passing through the centers of the magnetic members 14 intersect each other on the axis of rotation A.

An end of each of the magnetic members 14 positioned at the outer side in a radial direction is provided with a rotor-side wide-width portion 14a having both lateral sides protruding in the circumferential direction to widen the width of the end. Specifically, as shown in FIG. 5, when viewed in the direction of the axis of rotation A, an end of each of the magnetic members 14 positioned at the outer side in a radial direction is widened as it extends outward in a radial direction. Thereby, the protruding end of each of the magnetic members 14 is provided with the rotor-side wide-width portion 14a having a relatively wide cross-sectional width.

In addition, the cross-sectional surface 14b of the rotor-side wide-width portion 14a facing outward in the radial direction is formed in an arc shape. When viewed in the direction of the axis of rotation A, the magnetic members 14 are disposed such that the cross-sectional surfaces 14b are positioned on the circumference of an imaginary circle C the center of which is on the axis of rotation A.

Each magnet 16 is disposed in a gap between neighboring magnetic members 14. The magnetic members 14 and the magnets 16 closely contact each other in the circumferential direction. Each of the magnets 16 is positioned further inside in the radial direction than each of the magnetic members 14, and the cross-sectional surface 16a of each of the magnets 16 at the radially outer side is covered with the resin of the rotor body 12.

According to one embodiment, ferrite magnets having the same rectangular plate shape are used as the magnets 16. Specifically, ferrite magnets having a radial length within a range of 10 mm to 40 mm and residual magnetic flux density within a range 0.35 T to 0.5 T are used. If the length of each ferrite magnet in the direction of diameter of the rotor is less than 10 mm, the effect of concentration of magnetic flux may be degraded. In addition, if the diametrical length of the rotor is greater than 40 mm, magnetization of the ferrite magnets may become difficult. Therefore, the diametrical length of the rotor may be set to be between 10 mm and 40 mm.

The magnets 16 are disposed such that the magnetic poles thereof face each other in the circumferential direction. Specifically, given two magnets 16, 16 disposed to closely contact both lateral surfaces of one magnetic member 14, the lateral surfaces of the magnets 16, 16 closely contacting the magnetic member 14 both become the N pole or S pole.

Accordingly, in the rotor 10, the N pole is formed by a magnetic member 14 disposed between the N poles of the magnets 16, 16 on both sides of the magnetic member 14, and the S pole is formed by another magnetic member 14 disposed between the S poles of the magnets 16, 16 at both sides of the magnetic member 14. Thereby, in the case of the rotor 10, fifty six magnetic poles including the N and S poles are alternately disposed in the circumferential direction such that they are spaced a certain distance from each other and are parallel with each other.

Hereinafter, a method of manufacturing the rotor 10 will be described with reference to FIG. 8. FIG. 8 illustrates a cross-sectional surface of an injection molding mold 30 used to manufacture the rotor 10. FIG. 8(*a*) is a view showing a portion of the mold where the magnet 16 is disposed, and FIG. 8(*b*) is an enlarged view showing the region VIIb of FIG. 8(*a*).

The injection molding mold 30 generally includes a fixed mold 31 (a first mold) to mold the outer circumferential end of the rotor body 12, and a movable mold 32 (a second mold) disposed to face the fixed mold 31 and moving forward and backward with respect to the fixed mold 31 to mold the bottom 12*a* of the rotor body 12 in conjunction with the fixed mold 31.

The fixed mold 31 is provided with an annular recess 31*a* which is open upward. The magnetic members 14 and the magnets 16 are alternately disposed in the annular recess 31*a* to form a radial shape. The width of the annular recess 31*a* in the direction of diameter is slightly greater than the diametrical width of the magnetic member 14. The annular recess 31*a* is provided with an L-shaped protrusion 31*b* extending from the lower end of the inner circumferential surface to the inner side end of the bottom surface. Formed at the outer side end of the bottom surface is a protrusion 31*c* protruding upward. In addition, provided in the outer circumferential portion of the annular recess 31*a* of the fixed mold 31 is a slide pin 31*d* (a slide mold) to diametrically move forward and backward at the lower end of the outer circumferential surface of the annular recess 31*a*.

Meanwhile, formed at the lower portion of the movable mold 32 is a mold surface 32*a* to form the bottom surface 12*a* of the rotor body 12. When both molds are in a mold closed state, a cavity 33 corresponding to the rotor body 12 is formed between both molds. The slide pin 31*d* protrudes from a portion of the diametrically outer wall of the cavity 33 corresponding to the magnet 16. In addition, the L-shaped protrusion 31*b* protrudes diametrically outward from a portion of the inner wall of the cavity 33 corresponding to the magnet 16.

When the rotor 10 is manufactured using the injection molding mold 30, the magnetic members 14 and the magnets 16 are first disposed in the annular recess 31*a* with the molds opened. At this time, the magnets 16 are disposed between the protruding end of the slide pin 31*d* and the L-shaped protrusion 31*b*. Next, the injection molding mold 30 is closed to form the cavity 33. After the cavity 33 is formed, a molten resin is injected into the cavity 33 from a gate, which is not shown, to fill the cavity 33, and clamping of the injection molding mold 30 is performed. After the molten resin is cooled and solidified, the slide pin 31*d* is moved backward, the injection molding mold 30 is opened, and the rotor 10 is ejected. Thereby, the pin hole 12*h* is formed by the slide pin 31*d*, and the slit 12*g* is formed by the L-shaped protrusion 31*b*.

As discussed above, the magnet 16 is laterally fitted into the rotor in the direction of diameter of the rotor by the slide pin 31*d* and the L-shaped protrusion 31*b* of the injection molding mold 30. Thereby, the position of the magnet in the direction of diameter of the rotor is determined. That is, the diametrical position of the magnet 16 in the rotor may be determined with the injection molding mold 30. Accordingly, a separate operation to determine the position of the magnet 16 is not necessary, and therefore productivity of the rotor 10 may be improved.

The rotor 10 may be manufactured according to another method as follows. First, a plurality of magnetic members 14 is radially disposed in an annular form, and at the same time, each of the magnets 16 is disposed between neighboring magnetic members 14. Next, an adhesive is applied to the upper end surface or both upper end and lower end surfaces of the magnetic members 14 and the magnets 16 that are disposed in an annular shape. Then, the integrated magnetic members 14 and the magnets 16 are set in the mold for molding of the rotor body 12, and the rotor body 12 is molded. Since the magnetic members 14 and magnets 16 disposed in an annular form are integrated by applying the adhesive, a separate member such as a plate is not needed to dispose the members and magnets to be parallel with each other.

The stator 20 includes a yoke 22, teeth 24, and a coil 26.

The yoke 22 is formed in a cylindrical shape and fixed to the inner surface of the motor case 4. The inner circumferential surface 22*a* of the yoke 22 has a cross section formed in the shape of a ring the center of which is on the axis of rotation A. Forty eight teeth 24 are formed on the inner circumferential surface 22*a*. The yoke 22 and the teeth 24 are integrated with each other and formed by stacking metal plates in the direction of the axis of rotation A.

The teeth 24 protrude from the inner circumferential surface 22*a* of the yoke 22 toward the rotor 10 in a radial shape. Specifically, when viewed in the direction of the axis of rotation A, the teeth 24 protrude from the inner circumferential surface 22*a* of the yoke 22 toward the rotor 10 such that the lines L2 passing through the centers of the teeth 24 intersect each other on the axis of rotation A.

Each of the teeth 24 is provided, at the protruding end thereof, with a stator-side wide-width portion 24*a* having both lateral sides protruding to widen the protruding end. Specifically, as shown in FIG. 5, both circumferential lateral surfaces of the protruding end portion of each of the teeth 24 extend outward to the protruding end. Thereby, the protruding end of each of the teeth 24 is provided with the stator-side wide-width portion 24*a* having a relatively wide cross-sectional width.

The stator 20 is disposed such that the cross-sectional surfaces 24*b* of the stator-side wide-width portions 24*a* are all positioned on the circumference of an imaginary circle centered upon the axis of rotation A.

The teeth 24 are disposed equally spaced from each other in a circumferential direction, and a slot 28 (a space) extending in the direction of the axis of rotation A is formed between two neighboring teeth 24.

The stator 20 is provided with forty eight slots 28. By forming windings around the teeth 24 through the slots 28 in an ordered fashion, forty eight coils 26 are formed on the stator 20. In the motor 1, each of the coils 26 is formed on each of the teeth 24 (concentrated type coils).

To obtain stable output in the LRR section, the number of slots 28 may be equal to or greater than 24 with regard to motor design. Two times the number of pairs of the opposite poles is greater than the number of the slots 28 and equal to or less than 4/3 times the number of the slots 28.

For example, when the number of the slots 28 is 24, the number of the magnetic members 14 may be selected to be in the range of 25 to 32. In addition, when the number of the slots 28 is 48, the number of the magnetic members 14 may be selected to be in the range from 49 to 64. According to one embodiment, the motor 1 employs fifty six magnets 16.

In addition, as the motor 1 is required to compact in size, the number of slots may be set to be less than 24. In this case, neodymium magnets which produce stronger magnetic force than ferrite magnet may be used as the magnets 16. In this case, high torque may be maintained even when the size of the magnets 16 is decreased according to miniaturization of the motor 1. Specifically, neodymium magnets having a radial length within the range of 3 mm to 15 mm and residual magnetic flux density within the range of 1.1 T to 1.5 T may be used.

The rotor 10 and the stator 20 having the configuration as above are disposed such that the cross-sectional surface of the stator-side wide-width portion 24a of each of the teeth 24 and the cross-sectional surface of the rotor-side wide-width portion 14a of a corresponding one of the magnetic member 14 face each other with a fine gap therebetween.

The motor 1 is driven not only in the LRR section but also in the HRR section. In the HRR section, field weakening control is performed. That is, when the motor 1 is driven at a high rate of rotation, control to weaken the magnetic field is performed according to a predetermined timing.

Specifically, since the magnetic flux produced by the magnets 16 is constant, electromotive force (EMF) produced by the magnetic flux is increased by increase of the rate of rotation. In addition, when the rate of rotation is increased and thus the EMF is equal to the applied voltage of the power source, current is not allowed to flow to the motor 1, and thus the rate of rotation is not increased any more.

Therefore, by performing field weakening control to suppress increase of the EMF according to a timing in which field weakening control has less influence on production of torque in the motor 1, the motor 1 may rotate in the HRR section. Since field weakening control is a commonly known technology, a detailed description thereof will be omitted.

As such, with the motor 1, a stable output may be obtained not only in the LRR section but also in the HRR section.

However, as a magnetic flux concentrated-type motor is employed in the HRR section, and the magnetic flux density of a magnetic pole is increased, the motor 1 is likely to undergo iron loss, and the motor efficiency may be degraded thereby. In addition, in the HRR section, noise may be produced as discussed above. Since the noise is caused by resonance of the stator 20, it may not be addressed simply by suppressing torque ripple. Moreover, during the field weakening control, current to produce magnetic flux to weaken the magnetic field of the magnets 16 flows in the coil 26, and therefore demagnetization occurs in the areas of the magnets 16 close to the stator 20.

Hereinafter, reduction of iron loss will be described and then reduction of noise and demagnetization will be described.

In close study of reduction of iron loss, it has been discovered that field weakening control causes concentration of iron loss at the leading edges of the teeth 24.

Figure 9:
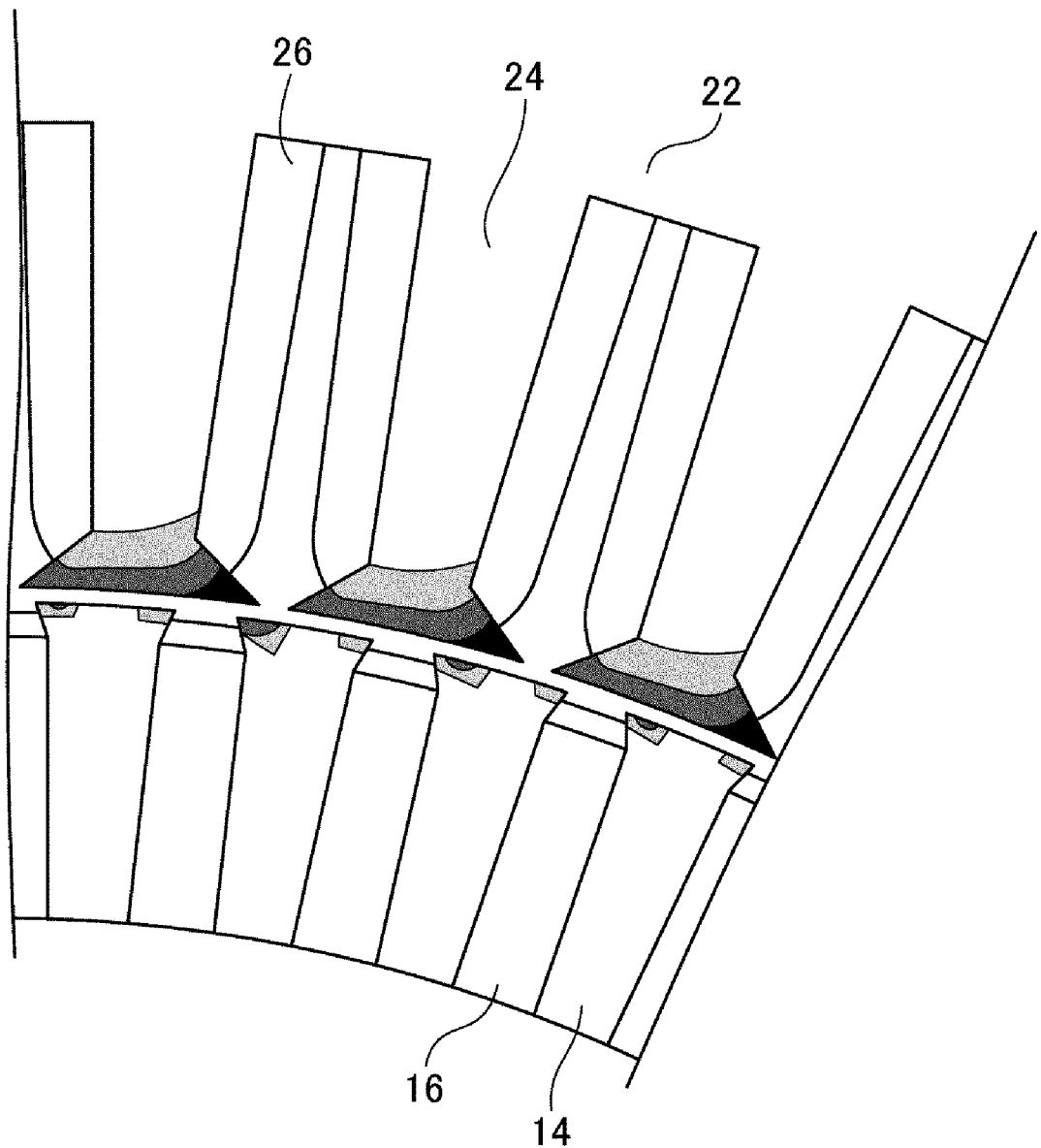
FIG. 9 is a view schematically illustrating distribution of iron loss in teeth in the case that field weakening control is performed.

FIG. 9 schematically shows distribution of iron loss in teeth in the case that field weakening control is performed. In FIG. 9, portions having greater iron loss are darker-colored. As is apparent from FIG. 9, little iron loss occurs in the yoke 22 and the bodies of the teeth 24, but is concentrated at the protruding end portions of the teeth 24, i.e., the stator-side wide-width portions 24a.

Figure 10:
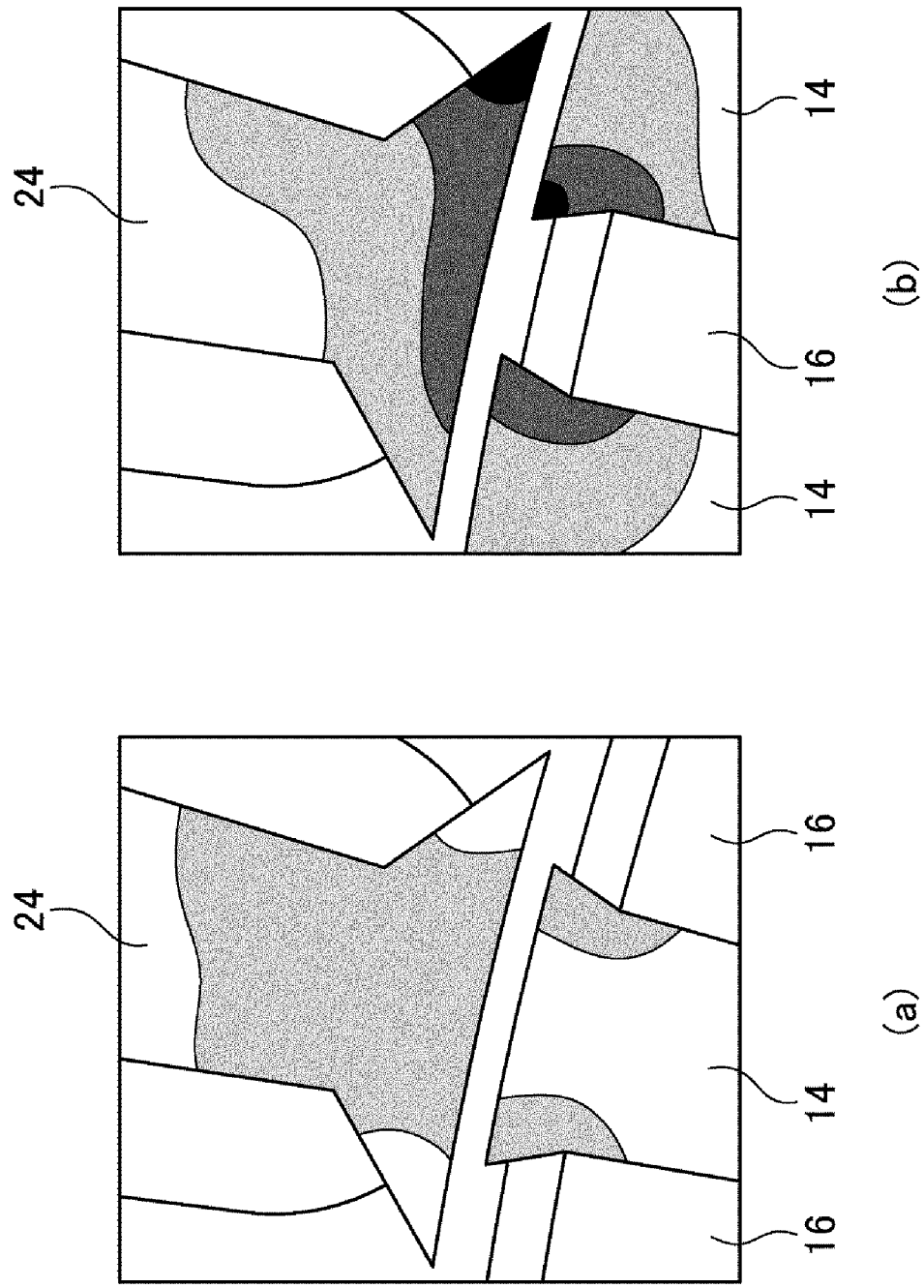
FIG. 10 parts 10(*a*) and 10(*b*) are views schematically illustrating distribution of iron loss in a stator-side wide-width portion at different positions.

In addition, as schematically shown in FIG. 10, concentration of iron loss in the stator-side wide-width portions 24a in the case of having each of the magnetic members 14 positioned to face a corresponding one of the teeth 24 (FIG. 10(a)) is different from the concentration of iron loss in the case of having a space between two neighboring magnetic members 14, 14 positioned to face a corresponding one of the teeth 24 (FIG. 10(b)).

Particularly, in the case that a space between two neighboring magnetic members 14, 14 is positioned to face a corresponding one of the teeth 24 as shown in FIG. 10(b), a short magnetic field allowing magnetic flux to flow in the space between the magnetic members 14, 14 through the stator-side wide-width portion 24a is created. As a result, it was discovered that the as magnetic flux density of the stator-side wide-width portion 24a increases, iron loss is further concentrated at the stator-side wide-width portions 24a.

Therefore, to reduce concentration of iron loss at the stator-side wide-width portions 24a of the motor 1, disposition of the magnetic members 14 is under study.

Hereinafter, disposition of the magnetic member 14, the magnet 16, and the teeth 24 will be described with reference to FIG. 11.

Figure 11:
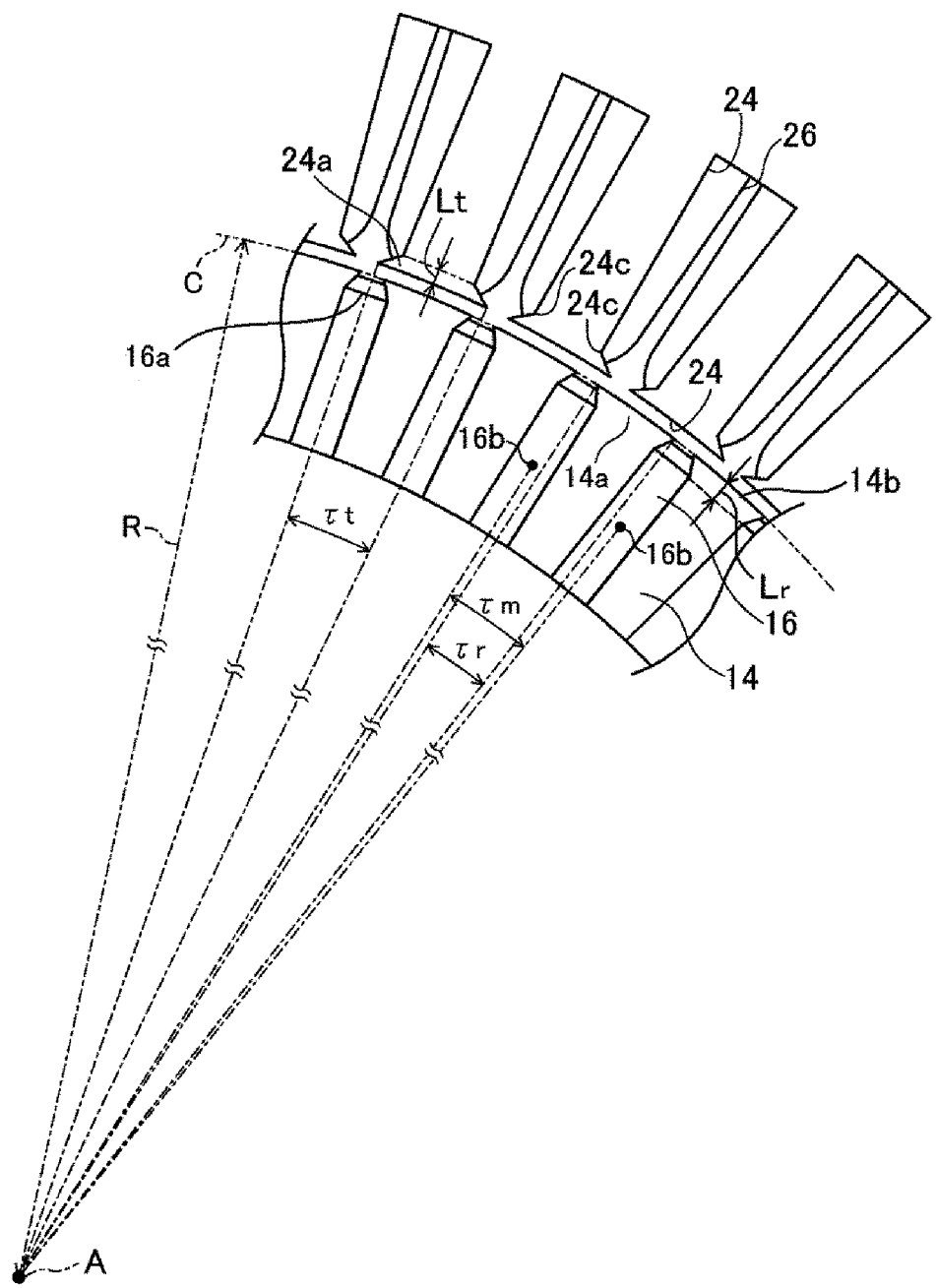
FIG. 11 is a view illustrating disposition of a magnet, a magnetic member, and teeth.

When viewed in the direction of the axis of rotation A as shown in FIG. 11, the length of a radial line connecting the cross-sectional surface 14b of the rotor-side wide-width portion 14a facing the fine gap to the axis of rotation A, i.e., the radius of an imaginary circle C, is defined as R. Similarly, when viewed in the direction of the axis of rotation A, the radial thickness of the stator-side wide-width portion 24a, more specifically, the distance between the cross-sectional surface 24b of the stator-side wide-width portion 24a and a boundary line connecting the curved portions 24c of both lateral surfaces of a tooth 24, from which the tooth 24 is widened, to indicate the boundary between the stator-side wide-width portion 24a and the tooth 24 is defined as Lt. In addition, the distance between the outer cross-sectional surface 16a of a magnet 16 at the outer side in the direction of diameter (i.e., the stator-side cross-sectional surface) and the outer cross-sectional surface 14b of the rotor-side wide-width portion 14a at the outer side in the direction of diameter (i.e., the stator-side cross-sectional surface) is defined as Lr.

When viewed in the direction of the axis of rotation A, the central angle between two radial lines connecting the centers 16b of any two neighboring magnets 16 to the axis of rotation A is defined as $\tau M$. The central angle between two radial lines connecting both circumferential lateral ends of a rotor-side wide-width portion 14a to the axis of rotation A is defined as $\tau r$.

When viewed in the direction of the axis of rotation A, the central angle between two radial lines connecting both circumferential lateral ends of a stator-side wide-width portion 24a to the axis of rotation A is defined as $\tau t$.

Using these parameters related to disposition of the magnetic members 14, influence on iron loss (IL) was analyzed. Specifically, within a practical range for disposition of the magnetic members 14, ratios of $\tau t$ and $\tau r$ to $\tau M$ ($\tau t/\tau m$ and $\tau r/\tau m$) were respectively changed and influence thereof on IL (unit: W) was investigated. Results of the analysis are shown in FIG. 12.

Figure 12:
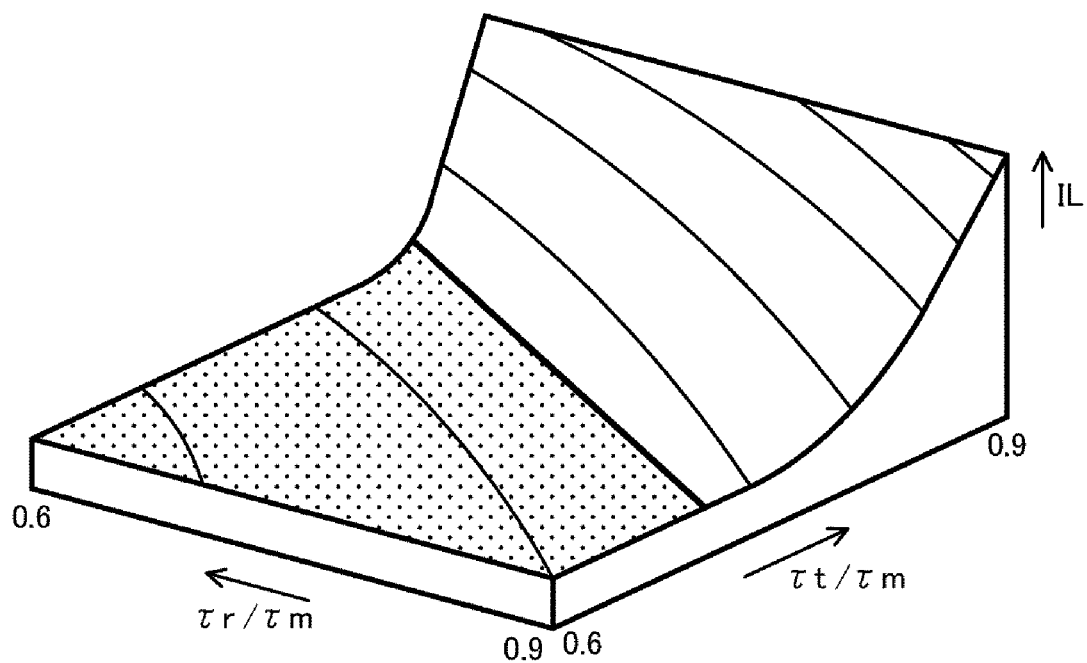
FIG. 12 is a three-dimensional graph depicting a relation between τt/τm, τr/τm, and IL (iron loss)

FIG. 12 is a three-dimensional graph schematically depicting a relation between change in $\tau r/\tau m$ and $\tau t/\tau m$ and IL. In FIG. 12, the X-axis and Y-axis indicated by arrows respectively represent τr/τm and τt/τm. The Z-axis represents IL.

As is apparent from FIG. 12, the IL is stabilized to have low values in one region by τr/τm and τt/τm, while IL is increased to have high values in other regions. Accordingly, a one-dimensional relation between τr, τt and τm to simply distinguish these regions from each other was estimated and, an equation representing a region within which the IL is effectively suppressed (the region marked with dots) was obtained as follows.

$$\tau r \leq 2.85 \times \tau m - 2.65 \times \tau t \quad \text{(Equation 1)}$$

In addition, within a practical range for disposition of the magnetic members 14, τt/τm and (L×P)/(τt×R) were respectively changed and influence thereof on IL was investigated. Results of the analysis are shown in FIG. 13.

Figure 13:
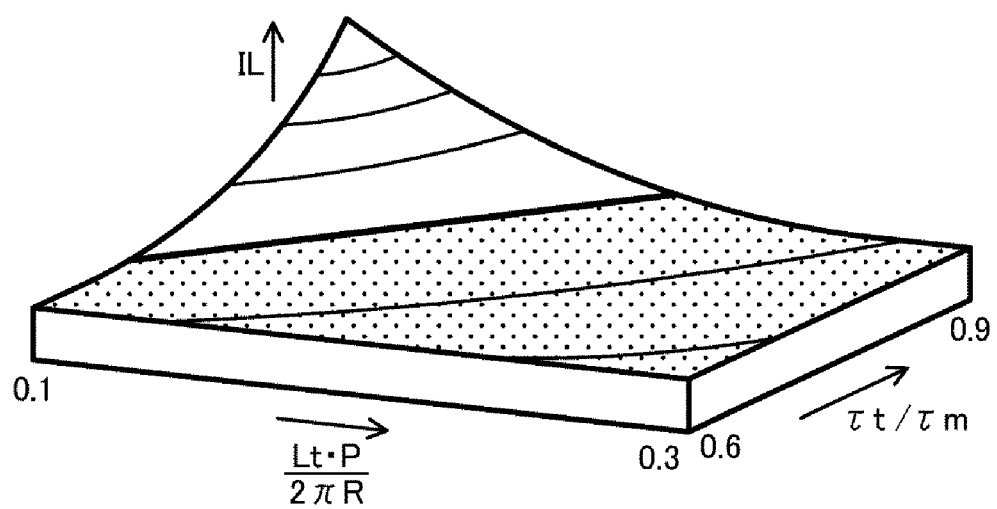
FIG. 13 is a three-dimensional graph depicting a relation between τt/τm, (Lt×P)/(τ×R), and IL.

Similar to FIG. 12, FIG. 13 is a three-dimensional graph schematically depicting a relation between change in τt/τm and (L×P)/(τ×R) and IL. Referring to FIG. 13, IL is stabilized to have low values in one region, and is increased to have high values in other regions. Accordingly, an equation representing a region within which IL is effectively suppressed (the region marked with dots) was obtained as follows.

$$(L \times P)/(\tau t \times R) \geq \tau t/\tau m - 0.6 \quad \text{(Equation 2)}$$

When τt, τr and τm are set to satisfy Equations 1 and 2, IL may be stably reduced, and therefore the efficiency of the magnetic flux concentrated-type motor to perform field weakening control may be enhanced.

In addition, τr and τm may be set to satisfy $$0.5 \leq \tau r/\tau m \leq 0.75 \quad \text{(Equation 3).}$$

When τr/τm is set to satisfy Equation 3, degradation of the EMF may be suppressed.

Figure 14:
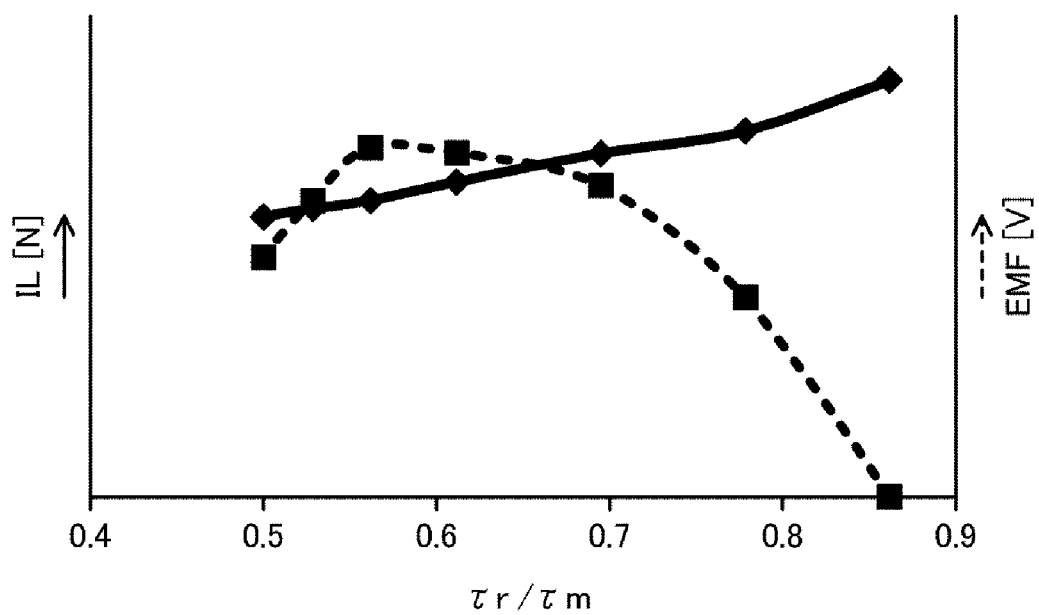
FIG. 14 is a graph depicting a relation between τr/τm, IL, and EMF (electromotive force)

FIG. 14 illustrates influence of change in τr/τm on IL and the EMF. In FIG. 14, the solid line indicates IL, and the dashed line indicates the EMF.

To reduce IL, the value of τr needs to be small. However, if the value of τr is excessively small, the EMF may be degraded, resulting in reduction in torque of the motor. FIG. 14 shows that the EMF tends to increase as τr/τm increases to about 0.6, and then decrease as τr/τm increases further. When τr/τm exceeds about 0.75, the EMF tends to decrease below the value obtained when τr/τm is 0.5.

According to the results, when parameters including τr are set to satisfy Equations 1 to 3, IL may be reduced, and degradation of the EMF may be prevented. Thereby, motor efficiency may be further enhanced.

Hereinafter, reduction of noise will be discussed.

As mentioned above, the magnetic flux concentrated-type motor is likely to cause noise or vibration. Particularly, when the motor is driven at a high rate of rotation, noise or vibration is remarkable. Since the noise is caused by resonance of the stator, it may not be addressed simply by suppressing torque ripple.

Figure 15:
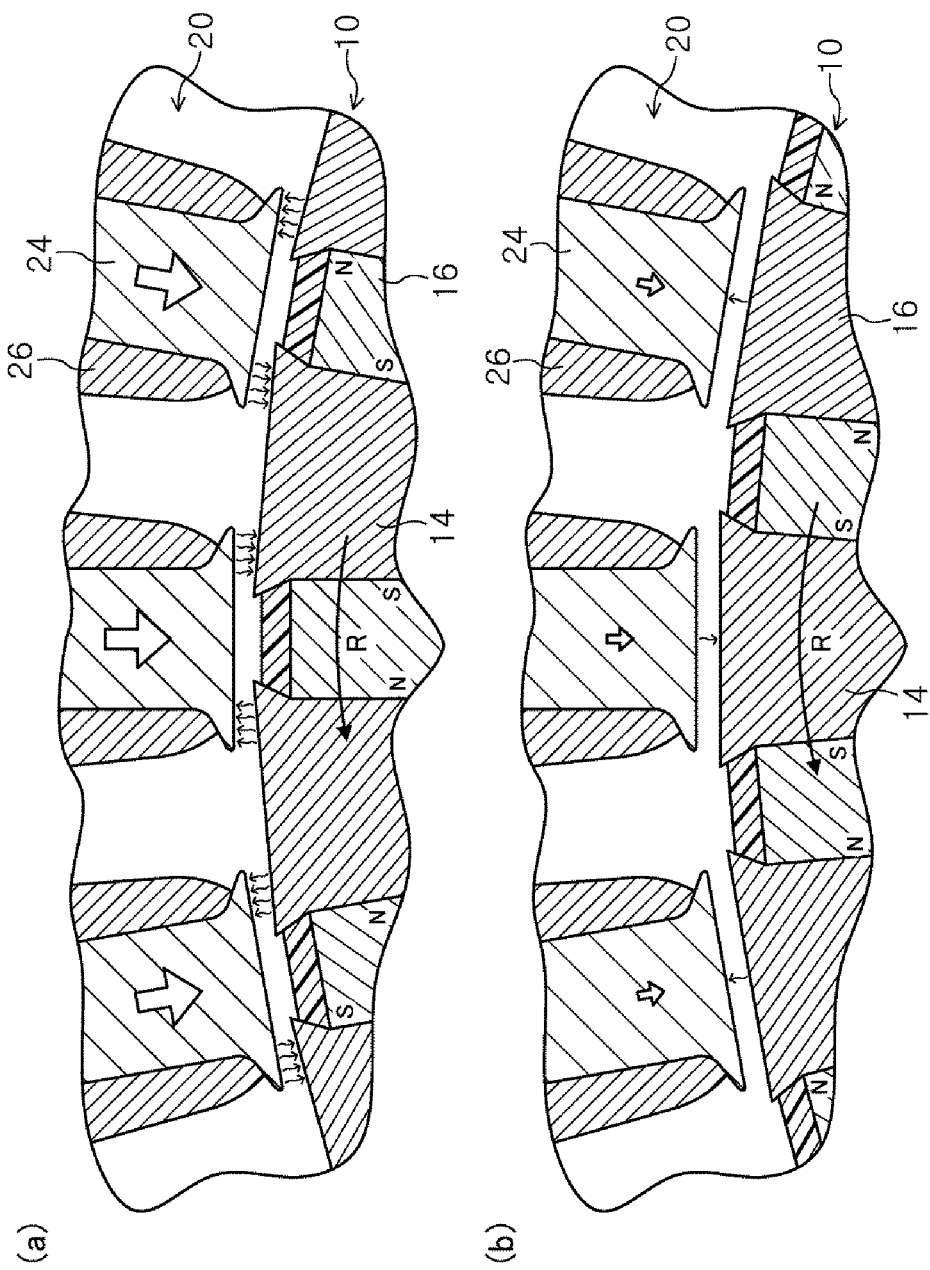
FIG. 15 parts 15(*a*) and 15(*b*) are views illustrating a structure of a magnetic flux concentrated-type motor that causes noise.

FIGS. 15(a) and 15(b) are views illustrating a structure of a magnetic flux concentrated-type motor that causes noise. The rotor 10 rotates in the direction indicated by arrow R. The rotor 10 is rotated by current supplied to the coil 26. In this embodiment, it is assumed that current is not supplied to the coil 26 (idling condition).

As shown in FIG. 15(a), when the portion between any two neighboring magnetic members 14 (an air gap between magnetic poles) is positioned to directly face a corresponding one of the teeth 24, a strong magnetic field is created between the two neighboring magnetic members 14 through the corresponding one of the teeth 24. As a result, attractive force directed toward the axis of rotation, which is indicated by a white arrow, is applied to each of the teeth 24.

As shown in FIG. 15(b), when the magnetic members 14 are positioned to directly face the teeth 24, the magnetic field is weakened, and thereby the attractive force applied to each of the teeth 24 is also weakened.

Figure 16:
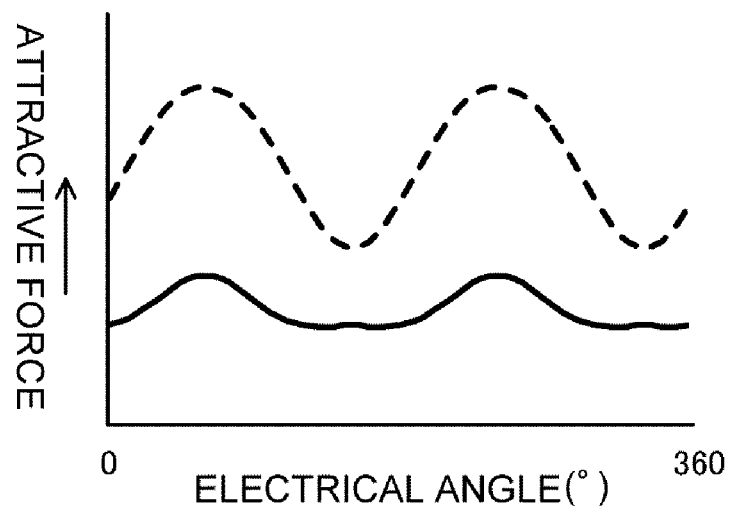
FIG. 16 is a graph depicting periodic change of attractive force applied to the stator.

Accordingly, when the rotor 10 rotates, strong attractive force directed toward the axis of rotation and applied to the teeth 24 as shown in FIG. 15(a) and weak attractive force as shown in FIG. 15(b) are periodically created FIG. 16 shows a graph depicting periodic change in attractive force (the solid line). This graph shows change of the attractive force in one electrical cycle (electrical angle of 360°) corresponding to rotation of the rotor having two magnetic members (N pole and S pole). As shown in FIG. 2, while the rotor rotates to complete one electrical cycle, the air gap between the magnetic poles directly faces the teeth twice. Accordingly, the attractive force has two peaks at which the attractive force becomes strong.

That is, every time the rotor completes one electrical cycle by rotation, the stator is strongly pulled twice toward the center of rotation in a radial direction, thereby being periodically contracted. As a result, vibration having a frequency twice the frequency of the electrical angle occurs in the stator.

When the frequency of vibration coincides with the natural frequency of the stator, resonance is caused, which produces noise. While FIG. 16 illustrates the attractive force of a second-order component with a frequency twice the frequency of the electrical angle, the attractive force of a higher-order component may be applied to the stator with frequencies multiple times (four times and six times) the frequency of the second-order component, and thus noise may occur at these frequencies.

In addition, when the magnetic flux concentrated-type motor is driven at a high rate of rotation, field weakening control may be performed. In this case, when the magnetic members directly face the teeth as shown in FIG. 15(b), magnetic flux to attenuate the magnetic flux of the magnetic members is created in the coil with a timing at which field weakening control has less influence on the torque.

Thereby, the attractive force applied to the teeth is further weakened when the magnetic members directly face the teeth. As a result, change of the attractive force between a strong state and a weak state is intensified as the dashed line in FIG. 16 suggests. Accordingly, contraction change of the stator is also intensified. Therefore, if field weakening control is performed, increase in noise may be caused.

To aid in understanding of the above description, disposition of the magnets, magnetic members, and teeth of the motor according to one embodiment will be described again with reference to FIG. 11. Referring to FIG. 11, when viewed in the direction of the axis of rotation A, the central angle between two radial lines connecting the centers 16b of any two neighboring magnets 16 to the axis of rotation A is defined as τm. The central angle between two radial lines connecting both circumferential lateral ends of a rotor-side wide-width portion 14a to the axis of rotation A is defined as τr. In addition, when viewed in the direction of the axis of rotation A, the central angle between two radial lines connecting both circumferential lateral ends of a stator-side wide-width portion 24a to the axis of rotation A is defined as τt.

Using these parameters related to disposition of the magnetic members 14, influence on the attractive force fR applied to the teeth 24 was analyzed. Specifically, within a practical range for disposition of the magnetic members 14, τt and τr have been respectively changed and influence thereof on the second-order component of the attractive force fR applied to the stator 20 in the radial direction was investigated. Results of the analysis are shown in FIG. 17.

Figure 17:
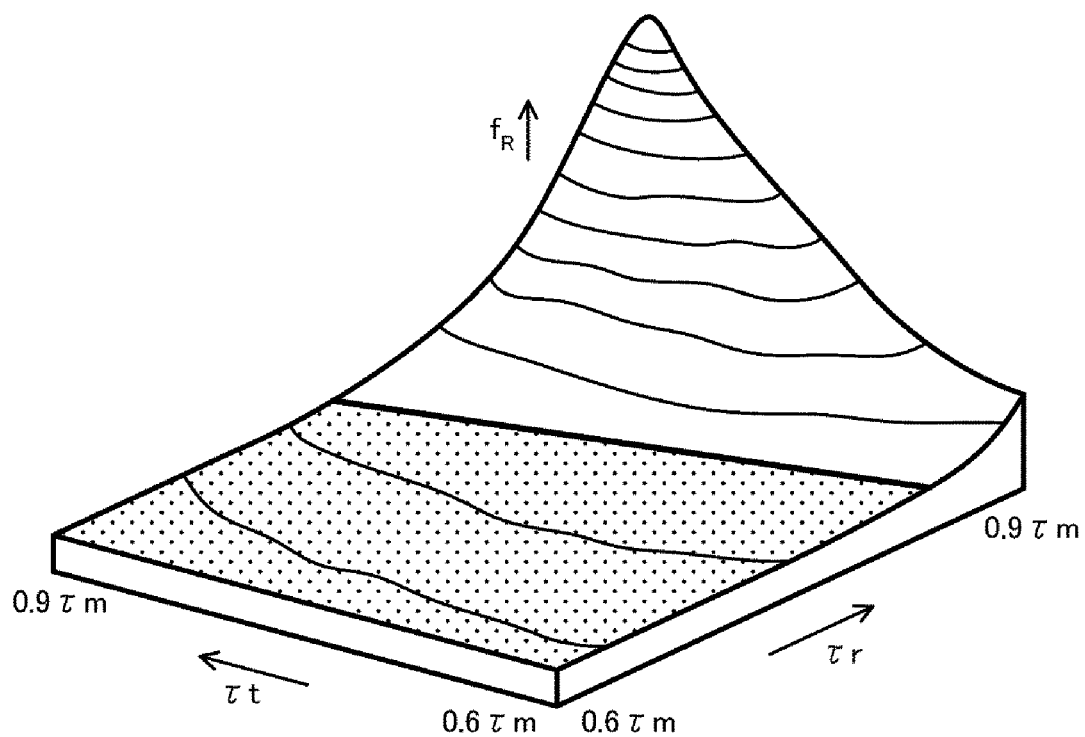
FIG. 17 is a three-dimensional graph depicting a relation between τt, τr, and fR.

FIG. 17 is a three-dimensional graph schematically depicting a relation between τt, τr and fR. In FIG. 17, the X-axis and Y-axis indicated by arrows respectively represent τt and τr, and the Z-axis represents fR. When the values of τr and τt increase, fR also increases. Particularly, fR is drastically increases within a certain region.

Accordingly, a one-dimensional relation between τr and τt to simply distinguish a region in which fR drastically increases from the other region in which fR does not drastically increase was estimated. As a result, an equation representing a region within which increase of fR is effectively suppressed (the region marked with dots) was obtained as follows.

$$\tau r \leq 1.1 \times \tau m - 0.46 \times \tau t \qquad \text{(Equation 4)}$$

When τt, τr and τm are set to satisfy Equation 4, increase of fR may be stably suppressed. Accordingly, even in the case of a magnetic flux concentrated-type motor that performs field weakening control, noise may be effectively reduced.

In addition, τr and τm may be set to satisfy $$0.5 \times \tau m \leq \tau r \leq 0.75 \times \tau m \qquad \text{(Equation 5)}.$$

When τr is set to satisfy Equation 5, degradation of the EMF may be suppressed.

Figure 18:
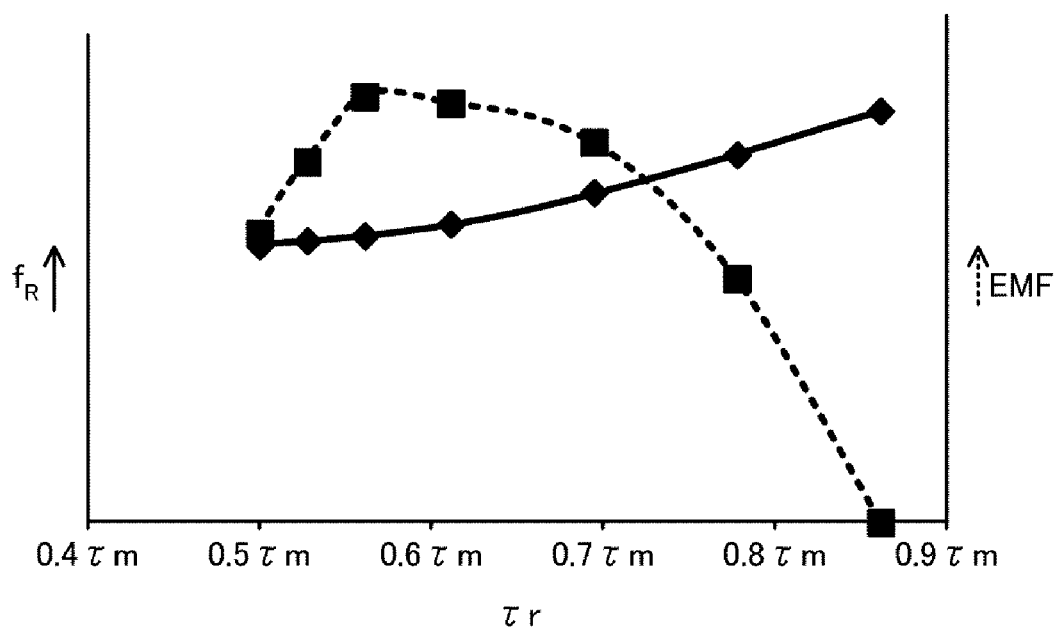
FIG. 18 is a graph depicting a relation between τr, fR, and EMF.

FIG. 18 illustrates influence of change in τr on fR and the EMF. In FIG. 18, the solid line indicates fR, and the dashed line indicates the EMF.

As described above, fR increases as τr increases, while the EMF has a peak. That is, the EMF increases as τr increases and then reaches a peak value when τr is about 0.6τm. Thereafter, the EMF decreases. When τr exceeds about 0.75τm, the EMF tends to decrease below the value obtained when τr is 0.5τm.

According to the results, when τr is set to satisfy Equations 4 and 5, the degradation of the EMF may be prevented. Thereby, noise may be reduced without causing great loss of torque.

Hereinafter, reduction of demagnetization will be discussed.

As mentioned above, since current to produce magnetic flux to weaken the magnetic field of the magnets 16 flows in the coil 26 during field weakening control, demagnetization occurs in the areas of the magnets 16 close to the stator 20. As one way to avoid demagnetization, the magnets 16 may be spaced apart from the stator 20. However, if the magnets 16 are spaced apart from the stator 20, the EMF of the motor 1 may be degraded.

Accordingly, the inventors of the present invention have conducted intensive research to suppress degradation of the EMF and to enhance resistance to demagnetization in field weakening control. Specifically, by respectively changing the central angle τr between the radial lines connecting both circumferential ends of the rotor-side wide-width portion 14a to the axis of rotation A, and the distance Lr between the diametrically outer cross-sectional surface 16a of a magnet 16 (i.e., the stator-side cross-sectional surface) and the diametrically outer cross-sectional surface 14b of the rotor-side wide-width portion 14a (i.e., the stator-side cross-sectional surface), changes in the magnitude of demagnetization of the magnet 16 and the EMF have been observed.

Figure 19:
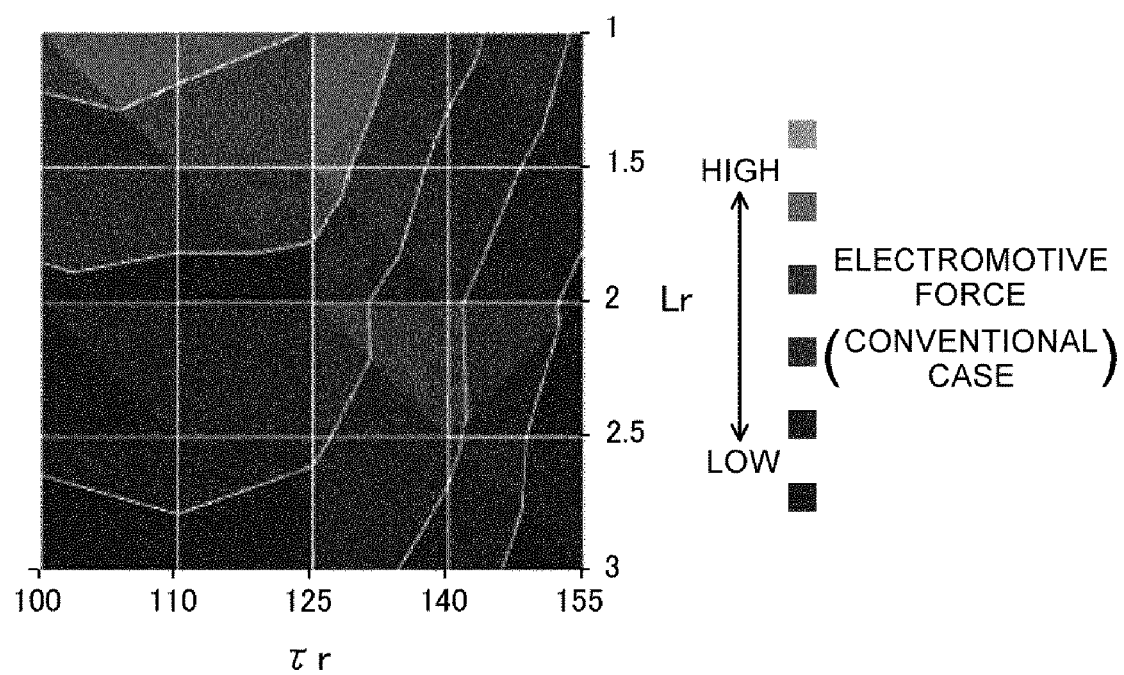
FIG. 19 is a view schematically illustrating distribution of electromotive force (EMF) with respect to the central angle τr between the radial lines connecting both circumferential lateral ends of the rotor-side wide-width portion to the axis of rotation of the rotor and the distance Lr between the stator-side cross-sectional surface of the rotor-side wide-width portion and the stator-side cross-sectional surface of a magnet.
Figure 21:
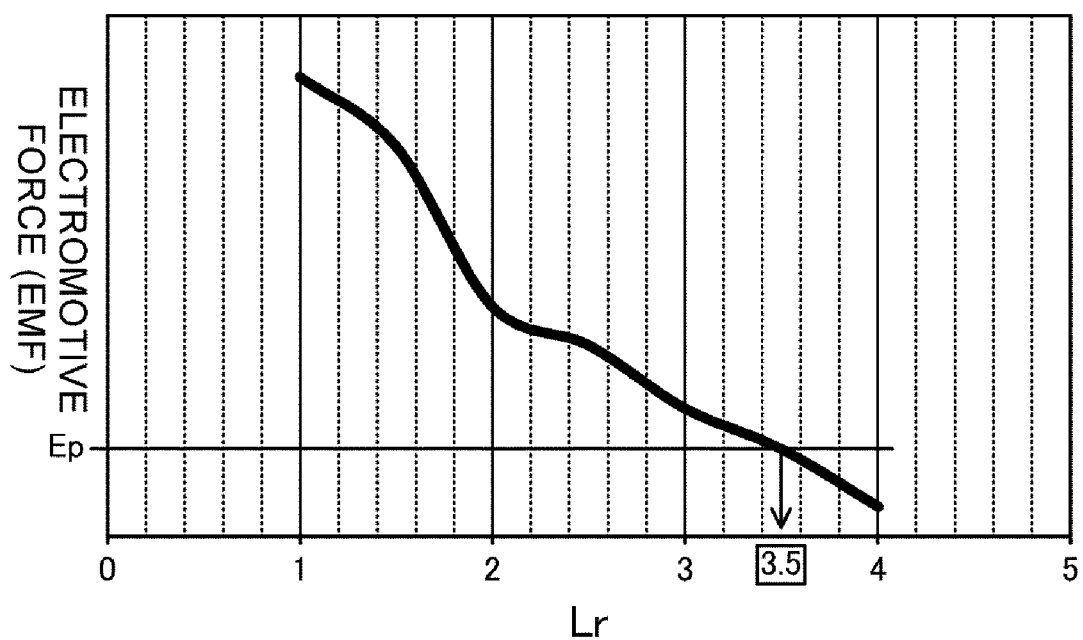
FIG. 21 is a graph depicting a relation between the distance Lr and the EMF.

Results of observation are shown in FIGS. 19 to 21. FIG. 19 is a view schematically illustrating distribution of the EMF with respect to the central angle τr and the distance Lr during rotation of the rotor 10 at a predetermined rate of rotation at which the field weakening control is performed. FIG. 20 is a view illustrating a relation of the central angle τr and the distance Lr to occurrence of demagnetization. Herein, the mark ◯ indicates no occurrence of demagnetization, and the mark x indicates occurrence of demagnetization. FIG. 21 is a graph depicting a relation between the distance Lr and the EMF.

In FIG. 19, the horizontal axis indicates the magnitude of the central angle τr represented by the electrical angle. As the value of the horizontal axis decreases, the rotor-side wide-width portion 14a of the magnetic member 14 is narrowed, and the distance to a neighboring rotor-side wide-width portion 14a is widened. As the value of the horizontal axis increases, the rotor-side wide-width portion 14a of the magnetic member 14 is widened, and the distance to a neighboring rotor-side wide-width portion 14a is narrowed. In FIG. 19, the vertical axis represents the distance Lr. As the value on the vertical axis decreases, the cross-sectional surface 16a of the magnet 16 at the stator side becomes closer to the cross-sectional surface 14b of the magnetic member 14 at the stator side. As the value on the vertical axis increases, the cross-sectional surface 16a of the magnet 16 at the stator side becomes more distant from the cross-sectional surface 14b of the magnetic member 14 at the stator side. In addition, in FIG. 19, a brighter region represents higher EMF. The fourth brightest area (i.e., the third darkest region) represents the conventional EMF.

As can be seen from FIG. 19, the EMF is lower in a region having a larger central angle τr and a longer distance Lr. This is because the magnetic flux from a magnet becomes difficult to loop through the spaces between neighboring rotor-side wide-width portions near the rotor-side wide-width portion 14a to reach the stator.

As can be seen from FIG. 20, in a region wherein the central angle τr represented by electrical angle is in the range of 110°≤τr≤140°, and Lr is equal to or greater than 2.0 mm, demagnetization does not occur. FIG. 21 shows change in the EMF according to change of the distance Lr with the central angle τr represented by electrical angle in the range of 110°≤τTr≤140°. In FIG. 21, Ep represents the magnitude of the conventional EMF. It can be seen from FIG. 21 that the EMF is greater than the value of the conventional EMF Ep when Lr is equal to or less than 3.5 mm.

According to the results, therefore, by setting the central angle τr represented by electrical angle to be in the range of 110°≤τr≤140° and setting the distance Lr to be in the range of 2.0 mm≤Lr≤3.5 mm, degradation of the EMF may be prevented and resistance to demagnetization may be enhanced.

Additionally, while the motor 1 in the above embodiment is an inner rotor-type motor having the rotor 10 disposed inside the stator 20, embodiments are not limited thereto. The motor 1 may be an outer rotor-type motor having the rotor 10 outside the stator 20.

In the above embodiment, the base end of the rotor-side wide-width portion 14a of the magnetic member 14, when viewed in the direction of extension of the axis of rotation A of the rotor 10, is formed in the shape of a straight line. However, embodiments are not limited thereto. The base end may be grooved in the magnetic member 14.

In addition, in the above embodiment, the slide pin 31d is arranged at the outer side of the annular recess 31a in the direction of diameter, and the L-shaped protrusion 31b is arranged at the inner side of the annular recess 31*a* in the direction of diameter. However, embodiments are not limited thereto. The slide pin 31*d* may be arranged at the inner side of the annular recess 31*a* in the direction of diameter and, the L-shaped protrusion 31*b* may be arranged at the outer side of the annular recess 31*a* in the direction of diameter.

As is apparent from the above description, according to one aspect of the present invention, iron loss may be effectively reduced during rotation at high speed at which field weakening control is performed. Accordingly, performance or efficiency of a motor may be enhanced.

According to another aspect of the present invention, attractive force periodically applied to the stator during rotation at high speed may be controlled. Accordingly, noise may be reduced.

According to another aspect of the present invention, during rotation of a brushless motor at high speed at which the field weakening control is performed, degradation of electromotive force may be suppressed and resistance to demagnetization may be enhanced. Accordingly, performance or efficiency of the motor may be enhanced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A brushless motor comprising a rotor rotatable about an axis of rotation, and a stator disposed inside or outside the rotor,
wherein:
the stator comprises a yoke provided with a circumferential surface having a ring-shaped cross section and facing the rotor, and a plurality of teeth, each of the teeth radially protruding from the circumferential surface of the yoke toward the rotor and being provided, at a protruding end thereof, with a stator-side wide-width portion having both lateral sides protruding to form a widened width; and
the rotor comprises a plurality of magnetic members, each of the magnetic members being provided with a rotor-side wide-width portion radially disposed at a circumferential edge of the rotor to face the stator and provided, at a stator-side end thereof, with both lateral sides protruding to form a widened width, and a plurality of magnets, each of the magnets being disposed between neighboring ones of the magnetic members such that the same magnetic poles face each other in a circumferential direction,
wherein, when a number of pairs of opposite poles of the rotor is P, a length of a radial line connecting a cross-sectional surface of the rotor-side wide-width portion to the axis of rotation is R, a radial thickness of the stator-side wide-width portion is Lt, a central angle between two radial lines connecting both circumferential ends of the stator-side wide-width portion to the axis of rotation is $\tau t$, a central angle between two radial lines connecting both circumferential ends of the rotor-side wide-width portion to the axis of rotation is $\tau r$, and a central angle between two radial lines connecting centers of any two neighboring magnets to the axis of rotation is $\tau m$, the motor is set such that $\tau r \leq 2.85 \times \tau m - 2.65 \times \tau t$ and $(Lt \times P)/(\pi \times R) \geq \tau t / \tau m - 0.6$.

2. The brushless motor according to claim 1, wherein the motor is set such that $0.5 \leq \tau r / \tau m \leq 0.75$.

3. The brushless motor according to claim 2, wherein, when a number of slots of the stator is S, S satisfies a relation of $4/3 \times S \geq 2 \times P > S$.

4. The brushless motor according to claim 3, wherein:
S is equal to or greater than 24; and
a residual magnetic flux density of each of the magnets is within a range of 0.35 T to 0.5 T.

5. The brushless motor according to claim 3, wherein:
S is less than 24; and
a residual magnetic flux density of each of the magnets is within a range of 1.1 T to 1.5 T.

6. A brushless motor comprising a rotor rotatable about an axis of rotation, and a stator disposed inside or outside the rotor,
wherein:
the stator comprises a yoke provided with a circumferential surface having a ring-shaped cross section and facing the rotor, and a plurality of teeth, each of the teeth radially protruding from the circumferential surface of the yoke toward the rotor; and
the rotor comprises a plurality of magnetic members, each of the magnetic members being provided with a rotor-side wide-width portion radially disposed at a circumferential edge of the rotor to face the stator and provided, at a stator-side end thereof, with both lateral sides protruding to form a widened width, and a plurality of magnets, each of the magnets being disposed between neighboring ones of the magnetic members such that the same magnetic poles face each other in a circumferential direction,
wherein, when a distance between a stator-side cross-sectional surface of any one of the magnetic members and a stator-side cross-sectional surface of a corresponding one of the magnets is Lr, and a central angle between two radial lines connecting both circumferential ends of the rotor-side wide-width portion to the axis of rotation is $\tau r$, the motor is set such that Lr is within a range of 2.0 mm $\leq$ Lr $\leq$ 3.5 mm, and $\tau r$ represented by an electrical angle is within a range of $110° \leq \tau r \leq 140°$.

7. The brushless motor according to claim 6, wherein the rotor further comprises a rotor body formed of a resin to have a cylindrical shape and disposed such that the rotor and the stator are coaxially arranged,
wherein the rotor body comprises a circular pipe-shaped inner circumferential wall, a circular pipe-shaped outer circumferential wall disposed at a diametrically outer side of the inner circumferential wall, a first surface to connect one axial end of the inner circumferential wall to one axial end of the outer circumferential wall, a second surface to connect the other axial end of the inner circumferential wall to the other axial end of the outer circumferential wall, the magnetic members and the magnets being housed in an inner space defined by the inner circumferential wall, the outer circumferential wall, the first surface, and the second surface,
wherein:
an angled corner formed by the inner circumferential wall and the first surface is provided, at a portion thereof corresponding to each of the magnets, with a slot extending from the inner circumferential wall to the first surface; and
the outer circumferential wall is provided, at a portion thereof corresponding to each of the magnets, with a through hole penetrating the outer circumferential wall in a thickness direction of the outer circumferential wall.

8. The brushless motor according to claim 7, wherein, when the number of pairs of opposite poles of the rotor is P and the number of slots of the stator is S, P and S satisfy a relation of S<2×P<4/3×S.

9. A brushless motor comprising a rotor rotatable about an axis of rotation, and a stator disposed inside or outside the rotor,
wherein:
the stator comprises a yoke provided with a circumferential surface having a ring-shaped cross section and facing the rotor, and a plurality of teeth, each of the teeth radially protruding from the circumferential surface of the yoke toward the rotor and being provided, at a protruding end thereof, with a stator-side wide-width portion having both lateral sides protruding to form a widened width; and
the rotor comprises a plurality of magnetic members, each of the magnetic members being provided with a rotor-side wide-width portion radially disposed at a circumferential edge of the rotor to face the stator and provided, at a stator-side end thereof, with both lateral sides protruding to form a widened width, and a plurality of magnets, each of the magnets being disposed between neighboring ones of the magnetic members such that the same magnetic poles face each other in a circumferential direction,
wherein, when a central angle between two radial lines connecting both circumferential ends of the stator-side wide-width portion to the axis of rotation is $\tau t$, a central angle between two radial lines connecting both circumferential ends of the rotor-side wide-width portion to the axis of rotation is $\tau r$, and a central angle between two radial lines connecting centers of any two neighboring magnets to the axis of rotation is $\tau m$, the motor is set such that $$\tau r \leq 1.1 \times \tau m - 0.46 \times \tau t.$$

10. The brushless motor according to claim 9, wherein the motor is set such that $0.5 \leq \tau r/\tau m \leq 0.75$.

11. The brushless motor according to claim 10, wherein, when a number of pairs of opposite poles of the rotor is P, and the number of slots of the stator is S, P and S satisfy a relation of 4/3×S≥2×P>S.

12. The brushless motor according to claim 11, wherein:
S is equal to or greater than 24; and
a residual magnetic flux density of each of the magnets is within a range from 0.35 T to 0.5 T.

13. The brushless motor according to claim 11, wherein:
S is less than 24; and
a residual magnetic flux density of each of the magnets is within a range from 1.1 T to 1.5 T.

* * * * *